United States Patent
Ko et al.

(10) Patent No.: US 11,051,147 B2
(45) Date of Patent: *Jun. 29, 2021

(54) ELECTRONIC APPARATUS AND METHOD OF OUTPUTTING CONTENT BY THE ELECTRONIC APPARATUS

(71) Applicant: SAMSUNG ELECTRONICS CO., LTD., Suwon-si (KR)

(72) Inventors: Jae-woo Ko, Uiwang-si (KR); Hang-sik Shin, Yongin-si (KR); Se-jun Park, Seoul (KR); Do-young Kim, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/730,078

(22) Filed: Dec. 30, 2019

(65) Prior Publication Data

US 2020/0162871 A1  May 21, 2020

Related U.S. Application Data

(63) Continuation of application No. 14/743,203, filed on Jun. 18, 2015, now Pat. No. 10,524,100, which is a (Continued)

(30) Foreign Application Priority Data

Sep. 7, 2012 (KR) .................. 10-2012-0099465

(51) Int. Cl.
 *H04M 3/00* (2006.01)
 *H04W 4/60* (2018.01)
 (Continued)

(52) U.S. Cl.
 CPC .............. *H04W 4/60* (2018.02); *H04W 4/80* (2018.02); *H04W 8/22* (2013.01)

(58) Field of Classification Search
 None
 See application file for complete search history.

(56) References Cited

U.S. PATENT DOCUMENTS

5,054,064 A 10/1991 Walker
8,079,908 B2 12/2011 Sotoike et al.
(Continued)

FOREIGN PATENT DOCUMENTS

CN 102117148 A 7/2011
EP 1 578 154 A1 9/2005
(Continued)

OTHER PUBLICATIONS

Communication dated Jul. 6, 2020, from the Brazilian Patent Office in counterpart application No. BR112015005034-4.
(Continued)

*Primary Examiner* — Jinsong Hu
*Assistant Examiner* — Alexander J Yi
(74) *Attorney, Agent, or Firm* — Sughrue Mion, PLLC

(57) ABSTRACT

Provided are an electronic apparatus and a method of outputting content. The method includes establishing a wireless communication connection with a second electronic apparatus, receiving apparatus information of the external apparatus from the second electronic apparatus, requesting the second electronic apparatus to establish a wireless communication connection between the first electronic apparatus and the external apparatus, receiving a response to the requesting from the second electronic apparatus, establishing a wireless communication connection between the first electronic apparatus and the external apparatus based on the response; and outputting content by using an executed
(Continued)

second application of the first electronic apparatus via the wireless communication connection between the first electronic apparatus and the external apparatus.

15 Claims, 17 Drawing Sheets

Related U.S. Application Data continuation-in-part of application No. 14/021,346, filed on Sep. 9, 2013, now Pat. No. 10,939,281.

(51) Int. Cl.
*H04W 8/22* (2009.01)
*H04W 4/80* (2018.01)

(56) References Cited

U.S. PATENT DOCUMENTS

| | | |
|---|---|---|
| 8,086,781 B2 | 12/2011 | Ananny et al. |
| 8,208,853 B2 | 6/2012 | Lydon et al. |
| 8,561,207 B2 | 10/2013 | Chinn et al. |
| 2005/0155077 A1 | 7/2005 | Lawrence |
| 2007/0234048 A1 | 10/2007 | Ziv |
| 2008/0051027 A1 | 2/2008 | Lee |
| 2008/0320041 A1 | 12/2008 | Engelsma et al. |
| 2010/0061294 A1 | 3/2010 | Proctor, Jr. et al. |
| 2010/0180063 A1 | 7/2010 | Ananny |
| 2010/0222049 A1 | 9/2010 | Kim |
| 2010/0262673 A1 | 10/2010 | Chang et al. |
| 2010/0317289 A1 | 12/2010 | Desai et al. |
| 2011/0030021 A1 | 2/2011 | Campagna |
| 2011/0176524 A1 | 7/2011 | Fasbender et al. |
| 2012/0030343 A1 | 2/2012 | Ryder |
| 2012/0072871 A1 | 3/2012 | Seo |
| 2012/0083208 A1 | 4/2012 | Giles et al. |
| 2012/0159607 A1 | 6/2012 | Wei et al. |
| 2012/0163241 A1 | 6/2012 | Sall |
| 2012/0272232 A1 | 10/2012 | Song |
| 2013/0102250 A1 | 4/2013 | Mutikainen |
| 2014/0009394 A1 | 1/2014 | Lee |
| 2014/0017996 A1 | 1/2014 | Hamilton |

FOREIGN PATENT DOCUMENTS

| | | |
|---|---|---|
| GB | 201208205 | 6/2012 |
| JP | 2009-183410 A | 8/2009 |
| JP | 2010-246045 A | 10/2010 |
| JP | 2012-91030 A | 5/2012 |
| JP | 2012-147146 A | 8/2012 |
| TW | 200806060 A | 1/2008 |
| WO | 2004/004395 A1 | 1/2004 |
| WO | 2005/109829 A1 | 11/2005 |
| WO | 2007/107982 A1 | 9/2007 |
| WO | 2009/121409 A1 | 10/2009 |
| WO | 2012/109696 A1 | 8/2012 |

OTHER PUBLICATIONS

Communication dated Apr. 30, 2018, issued by the Korean Intellectual Property Office in corresponding Korean Application No. 10-2012-0099465.
Communication dated Nov. 13, 2017, isuued by the Japanese Patent Office in counterpart Japanese Patent Application No. 2013-183766.
Communication dated Dec. 22, 2017, issued by the European Patent Office in counterpart European Patent Application No. 13183328.7.
Communication dated Jan. 29, 2018, issued by the State Intellectual Property Office of the People's Republic of China in counterpart Chinese Patent Application No. 201310406791.3.
Communication dated May 24, 2017 by the State Intellectual Property Office of P.R. China in counterpart Chinese Patent Application No. 201310406791.3
Communication dated Jul. 10, 2017 by the Japanese Patent Office in counterpart Japanese Patent Application No. 2013-183766.
Communication dated Nov. 21, 2016 issued by the Japanese Patent Office in counterpart Japanese Patent Application No. 2013-183766.
Mac People Editorial department; "iMac Perfect Guide Plus OS X Lion Edition 2012"; Aski/Media Works; Jan. 16, 2012; pp. 2-5/E; 5 pgs. total.
Berti, Silvia, et al., "A Taxonomy for Migratory User Interfaces," Interactive Systems Lecture Notes in Computer Science, vol. 3941, Jan. 1, 2006, pp. 149-160.
Communication, dated Jan. 21, 2014, issued by the European Patent Office in counterpart European Patent Application No. 13183328.7.
International Search Report (PCT/ISA/210), dated Jan. 29, 2014, issued by the International Searching Authority in counterpart International Patent Application No. PCT/KR2013/008007.
Schuchardt, Volker, et al., "Moving Mobile Applications between Mobile Devices Seamlessly," 34th International Conference on Software Engineering (ICSE), Jun. 2, 2012, pp. 1595-1598.
Vijayakumar, Priya, et al., "Application-Independent Session Mobility Between User Terminals," Mobility Aware Technologies and Applications Lecture Notes in Computer Science, vol. 3744, Jan. 1, 2005, pp. 305-315.
Written Opinion (PCT/ISA/237), dated Jan. 29, 2014, issued by the International Searching Authority in counterpart International Patent Application No. PCT/KR2013/008007.
Communication dated Jan. 27, 2020, issued by the Indian Patent Office in counterpart Indian Application No. 3979/CHE/2013.

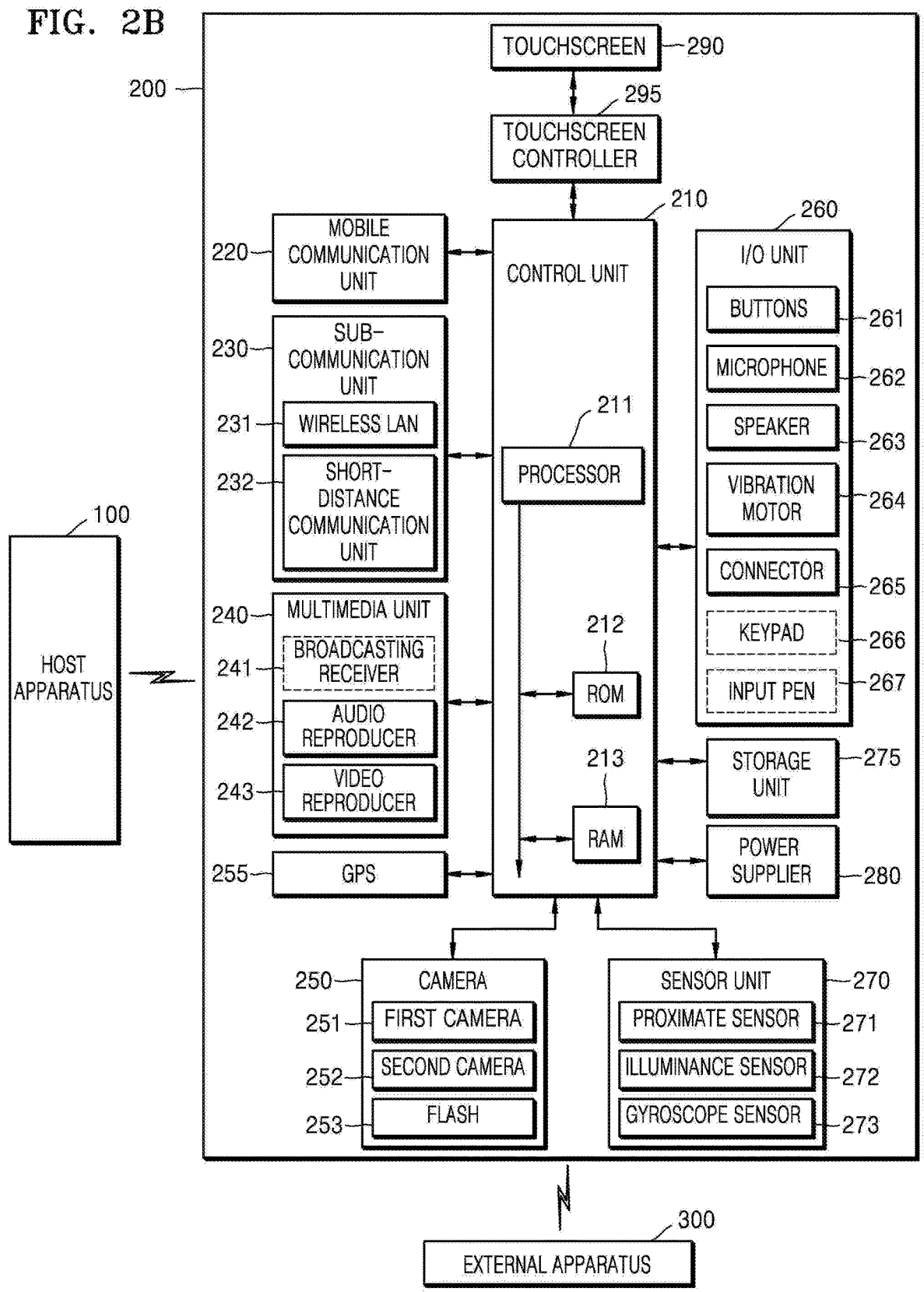

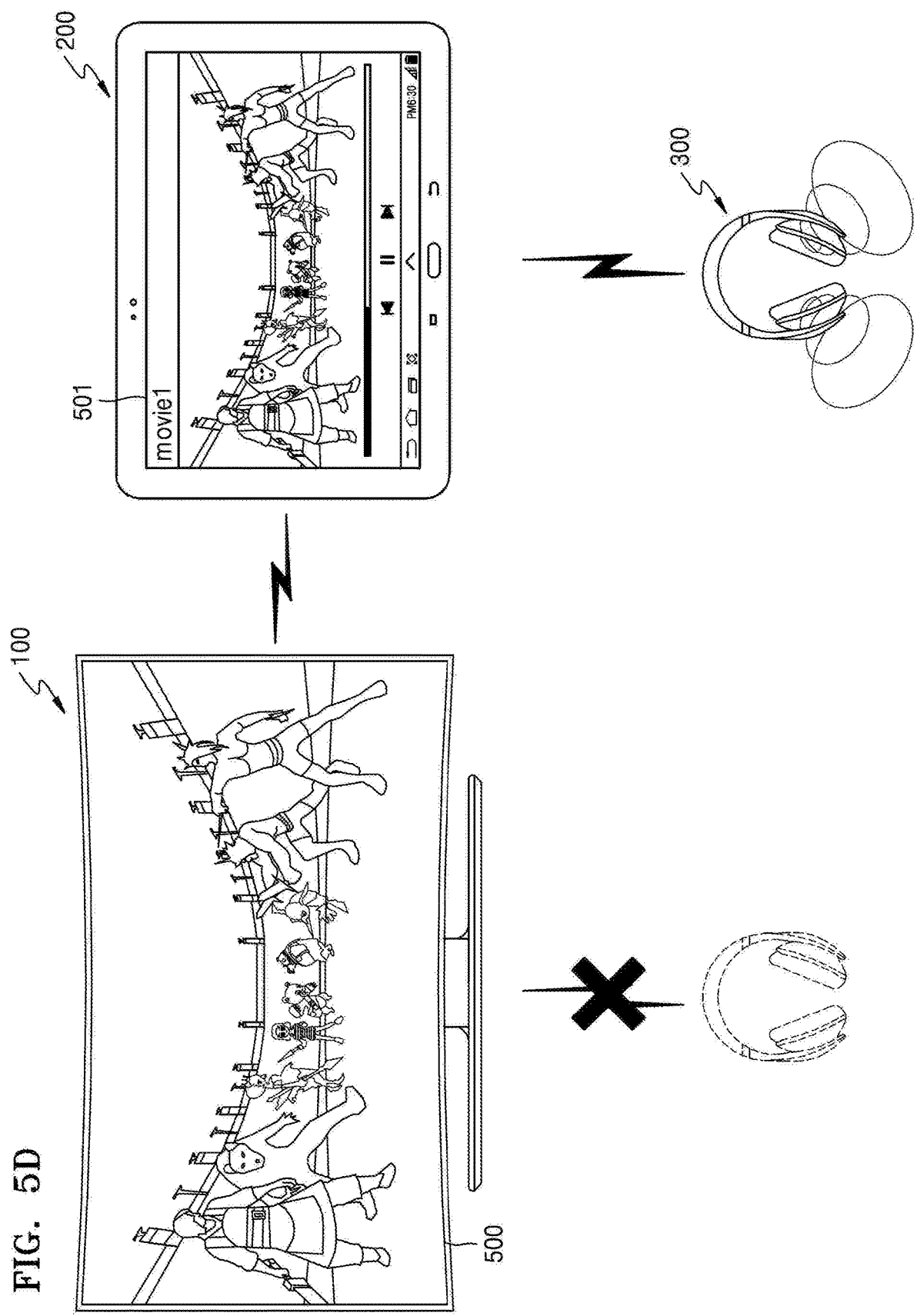

ELECTRONIC APPARATUS AND METHOD OF OUTPUTTING CONTENT BY THE ELECTRONIC APPARATUS

CROSS-REFERENCE TO RELATED APPLICATION

This application is continuation application of U.S. patent application Ser. No. 14/743,203, filed Jun. 18, 2015, which is a continuation in part of U.S. patent application Ser. No. 14/021,346, filed on Sep. 9, 2013, in the U.S. Patent and Trademark Office, which claims priority from Korean Patent Application No. 10-2012-0099465, filed on Sep. 7, 2012, in the Korean Intellectual Property Office, the disclosures of which are incorporated herein in their entirety by reference.

BACKGROUND

1. Field

One or more exemplary embodiments relate to an electronic apparatus and a method of outputting content, the method performed by the electronic apparatus.

2. Related Art

Portable apparatuses have become capable multi-tasking and providing various services and functions. Various applications that are installable in portable apparatuses are also being developed.

The portable apparatus may be connected in a wireless or wired manner with various external apparatuses by using the application installed in the portable apparatus, and may transmit content to the various external apparatuses. However, a user input is required to connect the portable apparatus with the various external apparatuses. If the portable apparatus and the various external apparatuses are being connected to each other for a first time, the procedure for connecting the apparatuses to each other may be complicated and inconvenient.

SUMMARY

Additional aspects will be set forth in part in the description which follows and, in part, will be apparent from the description, or may be learned by practice of the presented exemplary embodiments.

According to an aspect of an exemplary embodiment, a method of outputting content, the method performed by a first electronic apparatus is provided. The method includes operations of establishing a wireless communication connection with a second electronic apparatus, the second electronic apparatus wirelessly communicating with an external apparatus to output content reproduced in a first application to the external apparatus, receiving apparatus information of the external apparatus from the second electronic apparatus, requesting the second electronic apparatus to establish a wireless communication connection between the first electronic apparatus and the external apparatus, receiving a response to the requesting from the second electronic apparatus, establishing a wireless communication connection between the first electronic apparatus and the external apparatus based on the response, and outputting content by using an executed second application of the first electronic apparatus via the wireless communication connection between the first electronic apparatus and the external apparatus. The second application may be compatible with the first application.

The outputting of content may include receiving the content reproduced in the first application from the second electronic apparatus, and outputting content corresponding to the received content by using an executed second application of the first electronic apparatus via the wireless communication connection between the first electronic apparatus and the external apparatus.

According to an aspect of another exemplary embodiment, a method of outputting content, the method performed by a second electronic apparatus is provided. The method includes operations of outputting, via a wireless communication connection with an external apparatus, content that is reproduced in a first application of the second electronic apparatus, establishing a wireless communication connection with a first electronic apparatus in which a second application is executed, transmitting, to the first electronic apparatus, apparatus information of the external apparatus, receiving, from the first electronic apparatus, a wireless connection switch request with respect to the external apparatus, analyzing compatibility between the first application and the second application, transmitting a response to the wireless connection switch request to the first electronic apparatus, and in response to the first electronic apparatus and the external apparatus connecting, transmitting the content to the first electronic apparatus.

According to an aspect of another exemplary embodiment, a method of outputting content, the method performed by an external apparatus is provided. The method includes operations of establishing a wireless communication connection with a second electronic apparatus and outputting content received from the second electronic apparatus, receiving a request for switching the wireless communication connection from the second electronic apparatus to a first electronic apparatus, transmitting a response to the request to the second electronic apparatus, establishing a wireless communication connection with the first electronic apparatus based on the response, receiving, from the first electronic apparatus, content corresponding to content received from the second electronic apparatus; and outputting the content received from the first electronic apparatus. The external apparatus may be selectively connected to the first electronic apparatus or the second electronic apparatus.

BRIEF DESCRIPTION OF THE DRAWINGS

These and/or other aspects will become apparent and more readily appreciated from the following description of the exemplary embodiments, taken in conjunction with the accompanying drawings in which:

FIG. 2B illustrates a block diagram of the target apparatus, according to an exemplary embodiment;

FIGS. 5A through 5D illustrate the method of outputting content, the method performed by the host apparatus, the target apparatus, and the external apparatus, according to an exemplary embodiment;

DETAILED DESCRIPTION

Figure 1:
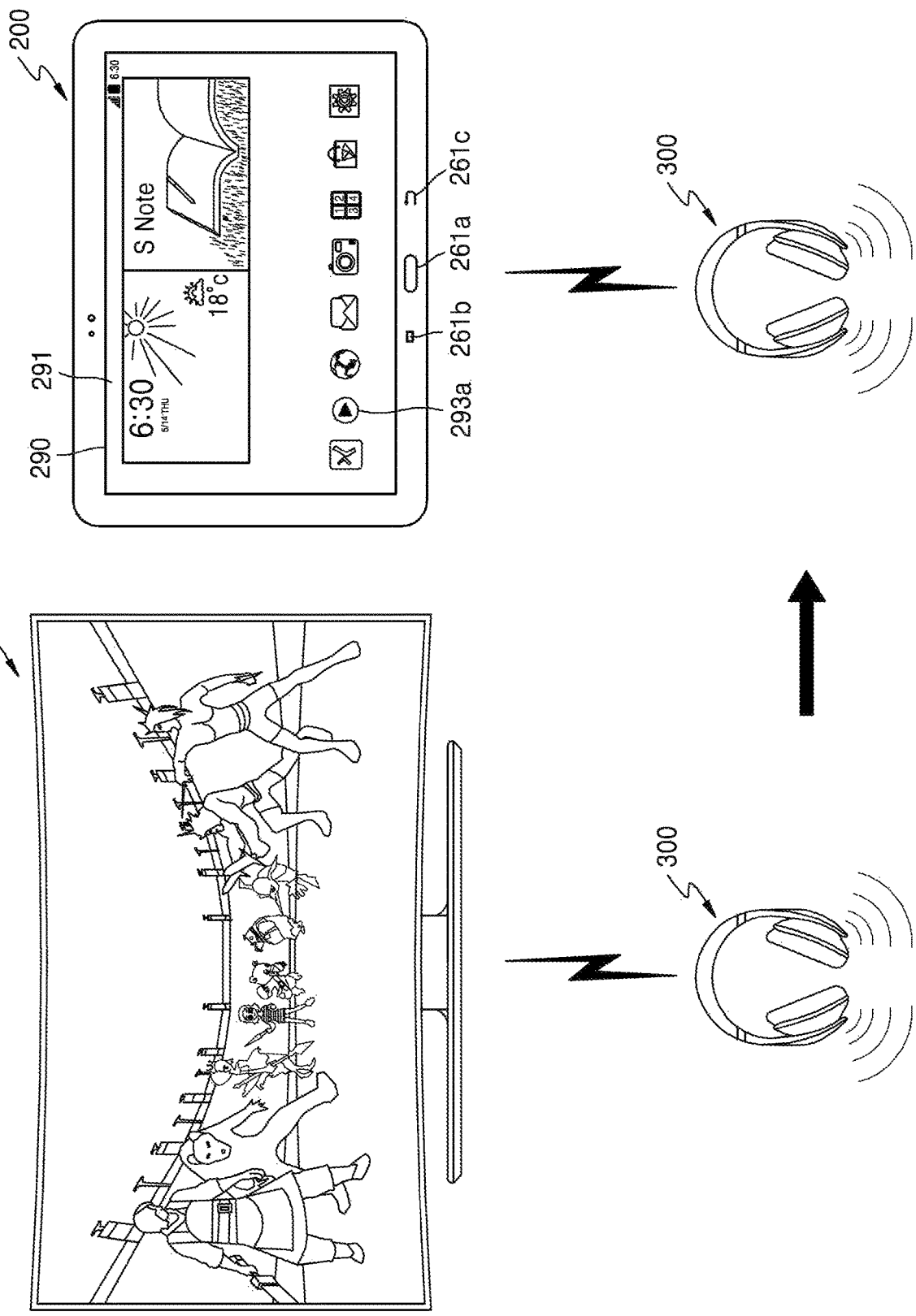
FIG. 1 illustrates connection between a host apparatus, a target apparatus, and an external apparatus, according to an exemplary embodiment.

Reference will now be made in detail to exemplary embodiments, examples of which are illustrated in the accompanying drawings. Like reference numerals or signs refer to like parts or elements that perform substantially the same functions.

While terms "first" and "second" are used to describe various components, the components are not limited to the terms "first" and "second". The terms "first" and "second" are used only to distinguish between each component. For example, a first component may be similar to a second component without conflicting with the inventive concept. As used herein, the term "and/or" includes any and all combinations of one or more of the associated listed items.

Throughout the specification, the term "application" may be software that is executed in a computer operating system (OS) or a mobile OS and is used by a user. For example, the application may include a word processor application, a spread sheet application, a contacts application, a calendar application, a memo application, an alarm application, a social network service (SNS) application, a chatting application, a map application, a music player application, or a video player application. In one or more exemplary embodiments, the application may be software that is executed in a portable apparatus or an external apparatus (e.g., a server, etc.) connected in a wireless or wired manner with the portable apparatus. In one or more exemplary embodiments, the application may be software that is executed in the portable apparatus in response to a received user input.

Throughout the specification, "content" may be displayed on an executed application. For example, the content may include a video or audio reproduced by the video player application that is one of the applications, audio reproduced by the music player application, a photo displayed in a photo gallery, a web page displayed on a web browser, or the like. The content may include a video file, an audio file, a text file, an image file, or a webpage that is displayed or executed in the application. The content may include a video file, an audio file, a text file, an image file, or a webpage that is executed according to a user input (e.g., a touch, etc.).

The content may include a screen of the executed application, and a user interface that configures the screen of the executed application. In addition, the content may include one item of content or a plurality of contents.

Throughout the specification, the term "widget" may be a mini-application that is one of graphical user interfaces (GUIs) that support interoperation between a user and an application or an OS. For example, the widget may include a weather widget, a calculator widget, a clock widget, or the like.

Furthermore, all examples and conditional language recited herein are to be construed as being without limitation to such specifically recited examples and conditions. Throughout the specification, a singular form may include plural forms, unless there is a particular description contrary thereto. Terms such as "comprise" or "comprising" are used to specify existence of a recited form, a number, a process, an operations, a component, and/or groups thereof, not excluding the existence of one or more other recited forms, one or more other numbers, one or more other processes, one or more other operations, one or more other components and/or groups thereof. Like numbers in the drawings refer to like elements that perform substantially the same functions throughout.

Throughout the specification, the terms "wireless connection switch request with respect to an external apparatus" and "external apparatus switch request" mean a request for switching a wireless connection with the external apparatus from one apparatus to another apparatus.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates connection between a host apparatus, a target apparatus, and an external apparatus, according to an exemplary embodiment Referring to FIG. 1, a display apparatus 100 (e.g., the host apparatus), a tablet apparatus 200 (e.g., the target apparatus), and an external apparatus 300 (e.g., a wireless audio apparatus) may be connected in a wireless manner with each other by using their communication units (not shown). For example, the display apparatus 100, the tablet apparatus 200, and the external apparatus 300 may be connected in an intra-structure mode in which apparatuses are wirelessly connected to each other via an ad-hoc mode or an access point (AP). The display apparatus 100 and the tablet apparatus 200 may be wirelessly connected via a server (not shown). Further, the display apparatus 100, the tablet apparatus 200, and the external apparatus 300 may be wirelessly connected via the server.

Wireless communication may include, but is not limited to, mobile communication, wireless local area network (LAN) such as Wi-Fi, Bluetooth, Bluetooth low energy (BLE), ZigBee, Wi-Fi Direct (WFD), ultra wideband (UWB), infrared Data Association (IrDA), and Near Field Communication (NFC). The display apparatus 100, the tablet apparatus 200, and the external apparatus 300 may be connected to each other in a wired manner by using a connector.

The display apparatus 100 that outputs content (e.g., video) reproduced by an application (e.g., a video player application) may output audio corresponding to the content by using the external apparatus 300 that is connected to the display apparatus 100 in a wireless manner. When an interoperating application is reproduced in the tablet apparatus 200 in response to a request from the tablet apparatus 200, the tablet apparatus 200 may output content that is received from the display apparatus 100 via seamless connection. The tablet apparatus 200 may be connected in a wireless manner with the external apparatus 300 and may output sound corresponding to the content. Each of the display apparatus 100, the tablet apparatus 200, and the external apparatus 300 may transmit or may receive various information (e.g., application information, host apparatus information, tablet apparatus information, external apparatus information, compatibility information, etc.) corresponding to interoperability and seamless connection.

Figure 2A:
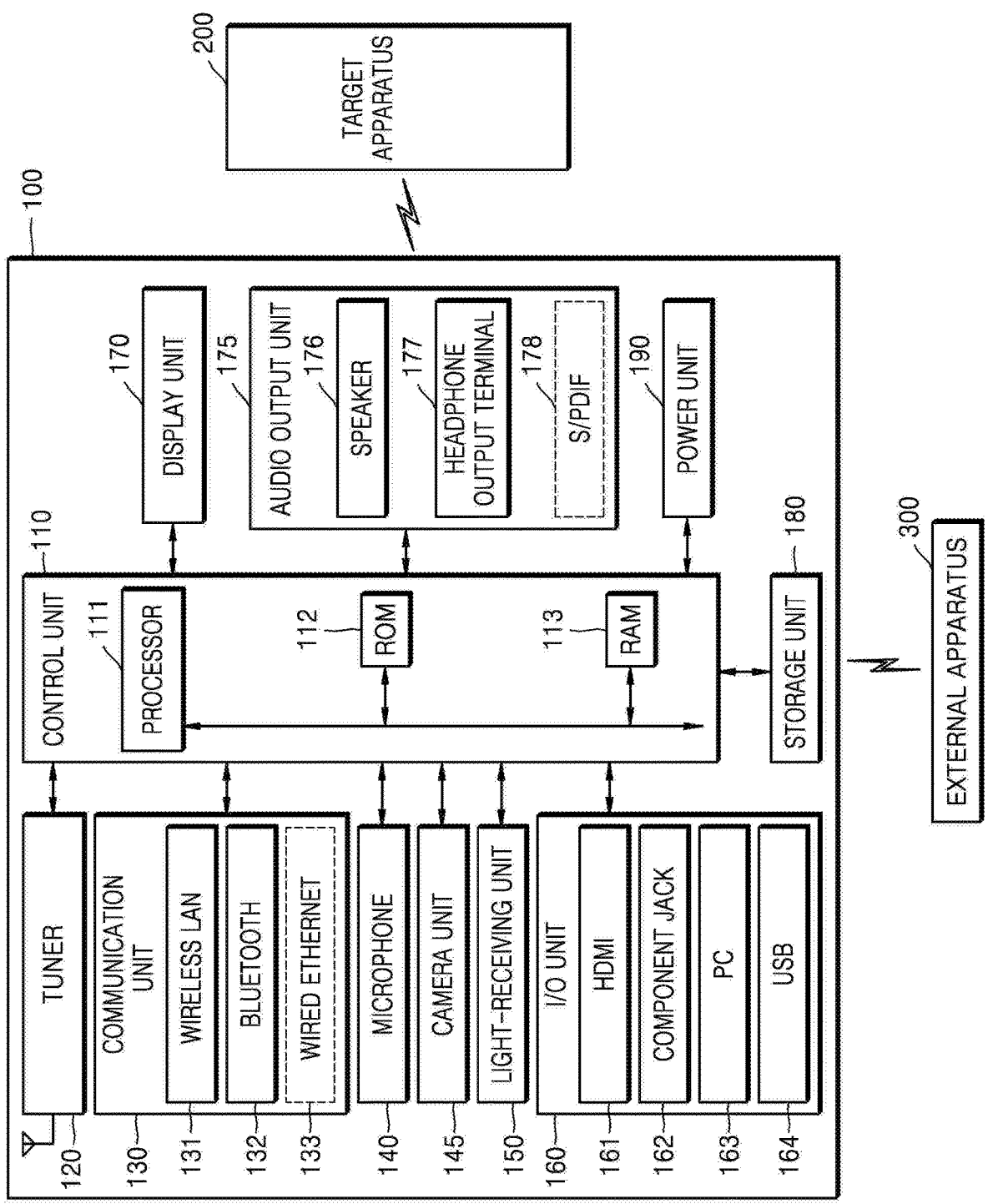
FIG. 2A illustrates a block diagram of a host apparatus, according to an exemplary embodiment.

FIG. 2A illustrates a block diagram of a host apparatus, according to an exemplary embodiment.

Referring to FIG. 2A, the display apparatus 100 (e.g., the host apparatus) that receives a control signal from a remote controller (not shown) may be connected in a wireless or wired manner with the target apparatus 200 (e.g., a tablet apparatus) and/or the external apparatus 300 (e.g., a wireless audio apparatus by using a communication unit 130 or an input/output (I/O) unit 160. The display apparatus 100 may be referred to as an electronic apparatus or the host apparatus that may be connected in a wireless or wired manner with the target apparatus 200 and/or the external apparatus 300 and may provide application information to the target apparatus 200. The display apparatus 100 may output audio (or video) corresponding to content via the connected external apparatus 300.

The target apparatus 200 may be an electronic apparatus that is connected in a wireless manner with the display apparatus 100 and receives the application information from the display apparatus 100, or may be the electronic apparatus that is connected in a wireless manner with the external apparatus 300 by the display apparatus 100 and outputs the audio (or the video) corresponding to the content to the target apparatus 200.

The external apparatus 300 indicates an electronic apparatus that may be connected in a wireless manner with the display apparatus 100 and/or the target apparatus 200 and may output audio or video received from one of the display apparatus 100 and the target apparatus 200. For example, the external apparatus 300 may include, but is not limited to, a home theatre (not shown), a wireless sound-bar (not shown), a wireless headset (not shown), a wireless earphone (not shown), a wireless headphone (not shown), a monitor (not shown), a mobile phone (not shown), a smartphone (not shown), a desktop personal computer (PC) (not shown), a notebook PC (not shown), and a tablet PC (not shown). The external apparatus 300 may be controlled in a wireless manner by the display apparatus 100 or the target apparatus 200.

The display apparatus 100 may include not only a display unit 170 (e.g., a display, etc.) but may also include a tuner 120, a communication unit 130 (e.g., a transceiver, communicator, etc.), and an I/O unit 160 (e.g., an input/output device, etc.). The display apparatus 100 may include not only the display unit 170 but may also include a combination of the tuner 120, the communication unit 130, and the I/O unit 160. In addition, the display apparatus 100 including the display unit 170 may be electrically connected to a separate electronic apparatus (e.g., a set top box (not shown)) having the tuner 120. For example, the display apparatus 100 may be embodied as an analog television (TV), a digital TV, a three-dimensional (3D) TV, a smart TV, a light-emitting diode (LED) TV, an organic light-emitting diode (OLED) TV, a plasma TV, or a monitor, but the display apparatus 100 is not limited to these examples.

The display apparatus 100 includes the tuner 120, the communication unit 130, a microphone 140, a camera unit 145 (e.g., a camera, etc.), a light-receiving unit 150 (e.g., a light receiver, etc.), the I/O unit 160, the display unit 170, an audio output unit 175 (e.g., an audio output, speaker, headphones, etc.), a storage unit 180 (e.g., a storage, a memory, etc.), and a power unit 190 (e.g., a power supply, etc.). The display apparatus 100 may include at least one sensor (e.g., an illuminance sensor, a temperature sensor, etc. (not shown)) that detects an internal status or an external status of the display apparatus 100.

A control unit 110 (e.g., a controller, etc.) included in the display apparatus 100 may include a processor 111, a read-only memory (ROM) 112 that stores a control program for controlling the display apparatus 100, and a random-access memory (RAM) 113 that is used to store a signal or data received from an external source of the display apparatus 100 or is used as a storage domain for various tasks that are performed in the display apparatus 100.

The control unit 110 controls all operations of the display apparatus 100 and a flow of signals between internal elements 120 through 190 of the display apparatus 100, and performs a data processing function. The control unit 110 controls power that is supplied from the power unit 190 to the internal elements 120 through 180. If a condition that is input or is set by a user and is stored is satisfied, the control unit 110 may execute an operating system (OS) and various applications stored in the storage unit 180.

The processor 111 may include a graphic processing unit (GPU) (not shown) for processing graphics that correspond to an image or a video. The processor 111 may be embodied as a System on Chip (SoC) including a core (not shown) and the GPU. The processor 111 may include a single core, a dual-core, a triple-core, a quad-core, or a multi-core.

The processor 111 may include a plurality of processors. For example, the processor 111 may be embodied as a main processor (not shown) and a sub-processor (not shown) that operates during a sleep mode. The processor 111, the ROM 112, and the RAM 113 may be connected to each other via an internal bus.

In the present exemplary embodiment, the term "a control unit of a display apparatus" includes the processor 111, the ROM 112, and the RAM 113.

The control unit 110 of a second electronic apparatus (e.g., the display apparatus 100) outputs, via a wirelessly-connected external apparatus, content that is reproduced in a first application of the second electronic apparatus; connects in a wireless manner with a first electronic apparatus (e.g., the target apparatus 200) in which a second application is executed; transmits, to the first electronic apparatus, apparatus information of the wirelessly-connected external apparatus; receives, from the first electronic apparatus, a wireless connection switch request with respect to the external apparatus; analyzes compatibility between the first application and the second application, and transmits a response to the wireless connection switch request to the first electronic apparatus; and if the first electronic apparatus and the external apparatus are connected, transmits the content to the first electronic apparatus.

The control unit 110 may control the second electronic apparatus (e.g., the display apparatus 100) to transmit the apparatus information of the external apparatus 300 to the first electronic apparatus (e.g., the target apparatus 200), in response to one of connection between the first electronic apparatus and the external apparatus 300, and reception of information about the first application.

The control unit 110 may control the second electronic apparatus to analyze compatibility between the first application and the second application, in response to an external apparatus switch request from the first electronic apparatus.

The control unit 110 may request the external apparatus 300 to change reception of the content from the second electronic apparatus to reception of the content from the first electronic apparatus, and may control the second electronic apparatus to receive, from the external apparatus 300, a response to the change request.

The control unit 110 may control the second electronic apparatus to transmit, to the first electronic apparatus, a response to the external apparatus switch request, according to a result of the compatibility analysis.

When the first electronic apparatus and the external apparatus 300 are connected, the control unit 110 may control the second electronic apparatus to terminate connection with the external apparatus 300.

The control unit 110 may provide at least one of visual feedback, acoustic feedback, and tactile feedback, according to a switch of a wireless connection with the external apparatus 300.

A configuration and operations of the control unit 110 may vary in one or more exemplary embodiments.

The tuner 120 may tune and select a frequency of a channel that a user wants to receive via the display apparatus 100. The frequency may be obtained by tuning, via amplification, mixing, and resonance, frequency components of a broadcasting signal that is received in a wired or wireless manner. The broadcasting signal includes an audio signal, a video signal, and additional information (e.g., an electronic program guide (EPG)).

The tuner 120 may receive a broadcasting signal from various sources including ground wave broadcasting, cable broadcasting, satellite broadcasting, internet broadcasting, or the like. The tuner 120 may also receive a broadcasting signal from a source such as analog broadcasting or digital broadcasting. The broadcasting signal received by the tuner 120 is decoded (e.g., audio decoding, video decoding, or additional information decoding) and is split into audio, video, and/or additional information. The split audio, video, and/or additional information may be stored in the storage unit 180 by control of the control unit 110.

The display apparatus 100 may include one or more tuners 120.

The tuner 120 may be embodied as one body (i.e., all-in-one) with the display apparatus 100, may be embodied as a separate electronic apparatus (e.g., a set-top box (not shown) that is electrically connected with the display apparatus 100 and has a tuner part, or may be embodied as a tuner (not shown) that is connected to the I/O unit 160.

The communication unit 130 may connect, by control of the control unit 110, the display apparatus 100 to the target apparatus 200 and/or the external apparatus 300. The control unit 110 may transmit application information, may transmit and receive content, and may transmit an application to the target apparatus 200 and/or the external apparatus 300 by using the communication unit 130.

The communication unit 130 may include one of a wireless LAN 131, Bluetooth 132, and a wired Ethernet 133 so as to correspond to performance and a structure of the display apparatus 100. In addition, the communication unit 130 may include a combination of the wireless LAN 131, the Bluetooth 132, and the wired Ethernet 133. The communication unit 130 may receive, by control of the control unit 110, a remote adjustment signal (including a control signal) of a remote controller (not shown). The remote adjustment signal may be implemented as a Bluetooth-type remote adjustment signal or a radio frequency (RF)-type remote adjustment signal.

The communication unit 130 may further include other short-range communication (e.g., NFC (not shown), BLE (not shown), etc.), in addition to Bluetooth.

The microphone 140 receives an uttered voice of a user. The microphone 140 may convert the received voice into an electrical signal and may output the electrical signal to the control unit 110. The voice of the user may include a voice that corresponds to a menu or a function of the display apparatus 100.

The microphone 140 may be integrally formed with the display apparatus 100 or may be separately formed from the display apparatus 100. The separately-formed microphone 140 may be electrically connected to the display apparatus 100 via the communication unit 130 or the I/O unit 160.

The microphone 140 may or may not be used based on the performance of tasks on the display apparatus 100 and a structure of the display apparatus 100.

The camera unit 145 receives an image (e.g., sequential frames) that corresponds to a user's motion including a gesture within a recognition range of a camera. For example, a recognition range of the camera unit 145 may be within a distance of 0.1 to 5 m from the camera unit 145 to a user. For example, the user's motion may include a motion of a part of a body of the user, e.g., a face, a facial expression, a hand, a fist, or a finger of the user. The camera unit 145 may convert, by control of the control unit 110, the received image into an electrical signal and may output the electrical signal to the control unit 110.

If the camera unit 145 includes a plurality of cameras, a 3D still image or a 3D motion may be obtained by using a first camera in a bezel and a second camera (not shown) that is adjacent to the first camera, the second camera being apart from the first camera by a distance greater than 2 cm and less than 8 cm.

The camera unit 145 may be integrally formed with the display apparatus 100 or may be separately formed from the display apparatus 100. A separate apparatus (not shown) including the separately-formed camera unit 145 may be electrically connected to the display apparatus 100 via the communication unit 130 or the I/O unit 160.

The camera unit 145 may or may not be used based on the performance of tasks and a structure of the display apparatus 100.

The light-receiving unit 150 receives an optical signal (including a control signal) from an external remote controller (not shown) via a light-receiving window of a bezel. The light-receiving unit 150 may receive an optical signal corresponding to a user input (e.g., a touch, a press, a touch gesture, a voice, or a motion) from the remote controller. The control signal may be extracted from the optical signal by control of the control unit 110.

The I/O unit 160 receives, by control of the control unit 110, video (e.g., a moving picture, etc.), audio (e.g., a voice, music, etc.), and additional information (e.g., an EPG, etc.) from an external source of the display apparatus 100. The I/O unit 160 may include one of a high-definition multimedia interface (HDMI) port 161, a component jack 162, a PC port 163, and a universal serial bus (USB) port 164. The I/O unit 160 may include a combination of the HDMI port 161, the component jack 162, the PC port 163, and the USB port 164.

A configuration and operations of the I/O unit 160 may vary in one or more exemplary embodiments.

By control of the control unit 110, the display unit 170 displays, on a screen, a video included in a broadcasting signal that is received by the tuner 120. The display unit 170 may display content (e.g., a video, etc.) that is received via the communication unit 130 or the I/O unit 160. The display unit 170 may output, by control of the control unit 110, a video stored in the storage unit 180. The display unit 170 may display a voice user interface (UI) (e.g., a voice UI including a voice command guide) for performing a voice recognition task corresponding to voice recognition or a motion UI (e.g., a motion UI including a user motion guide for motion recognition) for performing a motion recognition task corresponding to motion recognition.

In the present exemplary embodiment, the display unit 170 may output, by control of the control unit 110, a visual feedback that corresponds to switching a wireless connection with the external apparatus 300.

The audio output unit 175 outputs, by control of the control unit 110, audio included in a broadcasting signal that is received by the tuner 120. The audio output unit 175 may output audio (e.g., music or a sound) that is input via the communication unit 130 or the I/O unit 160. Further, the audio output unit 175 may output, by control of the control unit 110, audio stored in the storage unit 180. The audio output unit 175 may include at least one of a speaker 176, a headphone output terminal 177, and a Sony/Philips Digital Interface Format (S/PDIF) output terminal 178. The audio output unit 175 may include a combination of the speaker 176, the headphone output terminal 177, and the S/PDIF output terminal 178.

In the present exemplary embodiment, the audio output unit 175 may output, by control of the control unit 110, acoustic feedback that corresponds to switching a wireless connection with the external apparatus 300.

The storage unit 180 may store, by control of the control unit 110, various data, programs, or applications for driving and controlling the display apparatus 100. The storage unit 180 may store signals or a plurality of pieces of data that are input/output so as to correspond to operations of the tuner 120, the communication unit 130, the microphone 140, the camera unit 145, the light-receiving unit 150, the I/O unit 160, the display unit 170, the audio output unit 175, and the power unit 190.

The storage unit 180 may store a control program for a control operation by the display apparatus 100 or the control unit 110, an application that is originally provided by a manufacturer or is downloaded from an external source, a GUI related to the application, an object (e.g., an image text, an icon, a button, etc.) for providing the GUI, user information, documents, databases, or related data.

In the present exemplary embodiment, the term "storage unit" includes the storage unit 180, the ROM 112 and the RAM 113 of the control unit 110, or a memory card (e.g., a micro secure digital (SD) card (not shown) or a USB memory (not shown)) mounted to the display apparatus 100. The storage unit 180 may include a non-volatile memory, a volatile memory, a hard disk drive (HDD), or a solid-state drive (SSD).

Although not illustrated, the storage unit 180 may include a broadcasting receiving module, a channel control module, a volume control module, a communication control module, a voice recognition module, a motion recognition module, a light-receiving module, a display control module, an audio control module, an external input control module, a power control module, a voice database, or a motion database. The aforementioned modules and databases (not shown) of the storage unit 180 may be implemented as a plurality of pieces of software for performing a broadcasting reception control function, a channel control function, a volume control function, a communication control function, a voice recognition function, a motion recognition function, a light-receiving control function, a display control function, an audio control function, an external input control function, a power control function, or a power control function of the other external apparatus so as to control power of the other external apparatus that is connected in a wireless manner (e.g., Bluetooth). The control unit 110 may perform the aforementioned functions by using the plurality of pieces of software, respectively.

The power unit 190 supplies, by control of the control unit 110, power, which is input from an external power source, to the internal elements 120 through 180. The power unit 190 may supply, by control of the control unit 110, power to the internal elements 120 through 180. The power may be output from one or more batteries (not shown) arranged in the display apparatus 100.

At least one of the elements 120 through 190 of the display apparatus 100 shown in FIGS. 1 and 2A may be removed or at least one element may be added thereto, according to performances of the display apparatus 100. Positions of the elements 120 through 190 may be changed to correspond to performance or a structure of the display apparatus 100.

FIG. 2B illustrates a block diagram of the target apparatus 200, according to an exemplary embodiment.

Referring to FIG. 2B, the target apparatus 200 may be connected in a wired or wireless manner with the external apparatus 300 by using a mobile communication unit 220 (e.g., a mobile communicator, a mobile transceiver, etc.), a sub-communication unit 230 (e.g., a sub-communicator, etc.), or a connector 265. The target apparatus 200 may include a mobile phone, a smartphone, an MPEG Audio Layer-3 (MP3) player, a video player, a tablet PC, a wearable device, an electronic interactive whiteboard, or a display device. The display device may include an analog TV, a digital TV, a 3D TV, a smart TV, an LED TV, an OLED TV, a plasma TV, a monitor, a curved. TV with a screen having a fixed curvature, a flexible TV, a bent TV with a screen having a fixed curvature, and/or a changeable-curvature TV capable of changing its current sere curvature in response to a received user input. However, examples of the display device are not limited thereto.

The target apparatus 200 may indicate an electronic apparatus having a touchscreen 290 and capable of transmitting or receiving data (or content) to or from an external source by using the mobile communication unit 220 or the sub-communication unit 230. The target apparatus 200 may indicate an electronic apparatus having an input pen and a touch screen and capable of transmitting or receiving data (or content) to or from an external source by using the mobile communication unit 220 or the sub-communication unit 230. The target apparatus 200 may indicate an electronic apparatus having the touch screen 290 and a battery (not shown). The target apparatus 200 may indicate an electronic apparatus having a display unit (e.g., a display unit (not shown) that only has a display panel, without a touch panel) and capable of transmitting or receiving data (or content) to or from an external source by using the mobile communication unit 220 or the sub-communication unit 230. The target apparatus 200 may include an electronic apparatus capable of transmitting or receiving data (or content) to or from an external device by using interaction (e.g., a touch or a touch gesture) that is input to the touchscreen 290. The target apparatus 200 may have one or more touchscreens. In addition, the target apparatus 200 may have a plurality of screens that are divided on one touchscreen.

The target apparatus 200 may indicate an electronic apparatus that is connectable in a wireless manner with the display apparatus 100 and receives application information from the display apparatus 100, or may indicate an apparatus that is connected in a wireless manner with the external apparatus 300 by using information received from the display apparatus 100 and outputs audio (or video) corresponding to content to the external apparatus 300

The target apparatus 200 includes a control unit 210, the mobile communication unit 220, the sub-communication unit 230, a multimedia unit 240, a camera 250, a global positioning system (GPS) 255, an I/O unit 260, a sensor unit 270, a storage unit 275, and a power supplier 280. The target apparatus 200 includes the touchscreen 290 and a touchscreen controller 295.

The control unit 210 may include a processor 211, a ROM 212 storing a control program for controlling the target apparatus 200, and a RAM 213 used to store a signal or data received from an external source of the target apparatus 200 or used as a storage domain for various tasks that are performed in the target apparatus 200.

The control unit 210 controls all operations of the target apparatus 200 and a flow of signals between internal elements 220 through 295 of the target apparatus 200, and performs a data processing function. The control unit 210 controls a power supply to the internal elements 220 through 295 by using the power supplier 280. If a condition that is input or is set by a user and is stored is satisfied, the control unit 210 may execute an OS and an application stored in the storage unit 275.

The processor 211 may include a GPU (not shown) for processing graphics. The processor 211 may be embodied as a SoC including a core (not shown) and the GPU. The processor 211 may include a single core, a dual-core, a triple-core, a quad-core, or a multi-core. The processor 211, the ROM 212, and the RAM 213 may be connected to each other via an internal bus.

The control unit 210 may control the mobile communication unit 220, the sub-communication unit 230, the multimedia unit 240, the camera 250, the GPS 255, the I/O unit 260, the sensor unit 270, the storage unit 275, the power supplier 280, the touchscreen 290, and the touchscreen controller 295.

In the present exemplary embodiment, the control unit 210 of a first electronic apparatus (e.g., the target apparatus 200) connects the first electronic apparatus in a wireless manner with a second electronic apparatus (e.g., the display apparatus 100) that outputs content, which is reproduced in a first application, via a wirelessly-connected external apparatus; receives apparatus information of the external apparatus from the second electronic apparatus; transmits an external apparatus switch request to the second electronic apparatus and receives a response to the external apparatus switch request from the second electronic apparatus; and connects the first electronic apparatus in a wireless manner with the external apparatus 300, reproduces the content, which is received from the second electronic apparatus, in a second application, and outputs the content via the wirelessly-connected external apparatus 300. The second application is compatible with the first application.

The control unit 210 may control the first electronic apparatus (e.g., the target apparatus 200) to be connected with the external apparatus 300 by using one of the apparatus information of the external apparatus 300 and the response.

The control unit 210 may control the first electronic apparatus (e.g., the target apparatus 200) to receive, from the second electronic apparatus (e.g., the display apparatus 100), all or a part of the apparatus information of the external apparatus 300 stored in the second electronic apparatus (e.g., the display apparatus 100).

The control unit 210 may control the first electronic apparatus (e.g., the target apparatus 200) to transmit, to the second electronic apparatus (e.g., the display apparatus 100), an external apparatus switch request message including media information corresponding to information about the second application.

The control unit 210 may control the first electronic apparatus to receive, from the second electronic apparatus, a response message about the external apparatus switch request message. The response message includes access rights information with respect to the external apparatus 300.

The control unit 210 may control the content to be seamlessly output via the external apparatus 300 while the content is reproduced in the second application.

The control unit 210 may control the first electronic apparatus to provide at least one of visual feedback, acoustic feedback, and tactile feedback, in correspondence to an output of the content to the external apparatus 300. The content is reproduced in the second application.

When a plurality of the external apparatuses are connected with the second electronic apparatus, the control unit 210 may control the first electronic apparatus to receive apparatus information of each of the plurality of external apparatuses from the second electronic apparatus.

When the first electronic apparatus receives the apparatus information of each of the plurality of external apparatuses from the second electronic apparatus, the control unit 210 may control the first electronic apparatus to select one of the external apparatuses corresponding to a plurality of pieces of received apparatus information, and to request the second electronic apparatus to switch a wireless connection with the selected external apparatus from the second electronic apparatus to the first electronic apparatus.

In one or more exemplary embodiments, the term "a control unit" includes the processor 211, the ROM 212, and the RAM 213.

The mobile communication unit 220 may connect, by control of the control unit 210, the target apparatus 200 to the external apparatus 300 by using one or more antennas via a mobile communication network. The mobile communication unit 220 may exchange a wireless signal for a voice call, a video call, a short message service (SMS), a multimedia message (MMS), and data communication with a mobile phone (not shown), a smartphone (not shown), a tablet PC, a tablet device, or another portable apparatus (not shown) that has a connectable telephone number.

The sub-communication unit 230 may include at least one selected from a wireless LAN 231 and a short-distance communication unit 232 (e.g., a short-range transceiver, etc.). For example, the sub-communication unit 230 may include one of the wireless LAN 231 and the short-distance communication unit 232 or may include both the wireless LAN 231 and the short-distance communication unit 232.

The wireless LAN 231 may be connected to an AP, according to a control of the control unit 210, by using wireless communication in a place where the AP is installed. The wireless LAN 231 supports a wireless LAN standard (IEEE802.11x) of the Institute of Electrical and Electronics Engineers (IEEE). The short-distance communication unit 232 may wirelessly connect, by control of the control unit 210, the target apparatus 200 to the external apparatus 300 by using short-distance communication without the AP. The short-distance communication may include Bluetooth, BLE, IrDA, Wi-Fi, UWB, NFC, or the like.

The target apparatus 200 may include at least one selected from the mobile communication unit 220, the wireless LAN 231, and the short-distance communication unit 232, according to performance of the target apparatus 200. For example, the target apparatus 200 may include one of the mobile communication unit 220, the wireless LAN 231, and the short-distance communication unit 232, or a combination of the mobile communication unit 220, the wireless LAN 231, and the short-distance communication unit 232. The target apparatus 200 may be connected to an external accessory (e.g., a wireless speaker, a wireless headset, etc.) by using one of the mobile communication unit 220 and the sub-communication unit 230.

In the present exemplary embodiment, the term "communication unit" includes the mobile communication unit 220 and the sub-communication unit 230.

The multimedia unit 240 may include a broadcasting receiver 241, an audio reproducer 242, or a video reproducer 243. The broadcasting receiver 241 may receive, by control of the control unit 210, a broadcasting signal (e.g., a TV broadcasting signal, a radio broadcasting signal, or a data broadcasting signal) and broadcasting additional information (e.g., an EPG or an electric service guide (ESG)) that are broadcast from an external broadcasting station via an antenna (not shown). The control unit 210 may reproduce the broadcasting signal and the broadcasting additional information by using the touchscreen 290, a video codec (not shown), and an audio codec (not shown).

The audio reproducer 242 may reproduce, by control of the control unit 210, an audio source (e.g., an audio file with a file format of mp3, wma, ogg, or way), which is pre-stored in the storage unit 275 of the target apparatus 200 or is received from an external source, by using an audio codec.

In the present exemplary embodiment, the audio reproducer 242 may reproduce, by control of the control unit 210, acoustic feedback (e.g., an output of the audio source stored in the storage unit 275) by using an audio codec so as to correspond to a switch of a wireless connection with the external apparatus 300 and an output of content to the external apparatus 300.

The video reproducer 243 may reproduce, by control of the control unit 210, a digital video source (e.g., a file with a file format of mpeg, mpg, mp4, avi, mov, or mkv), which is pre-stored in the storage unit 275 of target apparatus 200 or is received from an external source, by using a video codec. A multimedia application that is installable in the target apparatus 200 may reproduce an audio source or a video file by using an audio codec and/or a video codec. A multimedia application that is installable in the target apparatus 200 may reproduce a video file by using a hardware codec (not shown) and/or a software codec (not shown).

In the present exemplary embodiment, the video reproducer 243 may reproduce, by control of the control unit 210, visual feedback (e.g., an output of the video source stored in the storage unit 275) by using a video codec so as to correspond to the switch of the wireless connection with the external apparatus 300 and an output of the content to the external apparatus 300.

The multimedia unit 240 may include the audio reproducer 242 and the video reproducer 243 and may exclude the broadcasting receiver 241 so as to correspond to performance or a structure of the target apparatus 200. The audio reproducer 242 or the video reproducer 243 of the multimedia unit 240 may be included in the control unit 210.

In one or more exemplary embodiments, the term "audio codec" may include one or more audio codecs. In one or more exemplary embodiments, the term "video codec" may include one or more video codecs.

The camera 250 may include a first camera 251 of a front surface and a second camera 252 of a rear surface, which capture a still image or a moving picture, according to control by the control unit 210. The camera 250 may include the first camera 251 or the second camera 252. The first camera 251 or the second camera 252 may include an auxiliary light source (e.g., a flash 253) that provides an amount of light for the capturing operation.

The control unit 210 may capture a 3D still image or a 3D moving picture by using the first camera 251 of the front surface and an additional camera (e.g., a third camera (not shown)) that is positioned adjacent to the first camera 251 (e.g., a distance between the first camera 251 and the additional camera may be greater than about 30 mm and less than about 80 mm). The control unit 210 may capture a 3D still image or a 3D moving picture by using the second camera 252 of the rear surface and an additional camera (e.g., a fourth camera (not shown)) that is positioned adjacent to the second camera 252 (e.g., a distance between the second camera 252 and the additional camera may be greater than about 30 mm and less than about 80 mm). The first and second cameras 251 and 252 may capture a wide angle image, a telephoto image, and a macro image by using an additional lens (not shown) that is detachable to an additional adaptor (not shown).

The GPS 255 periodically receives a plurality of pieces of information (e.g., information about an accurate location and time of a GPS satellite that is receivable by the target apparatus 200) from a plurality of GPS satellites orbiting Earth. The target apparatus 200 may recognize its location, a movement speed, or a time of the target apparatus 200 by using the plurality of pieces of information received from the plurality of GPS satellites.

The I/O unit 260 may include at least one selected from one or more buttons 261, a microphone 262, a speaker 263, a vibration motor 264, the connector 265, a keypad 266, and an input pen 267.

Referring to FIG. 1, the one or more buttons 261 include a home button 261a, a menu button 261b, and a back button 261c that are positioned at a lower portion of the front surface. The one or more buttons 261 may also include a power/lock button (not shown) and one or more volume buttons (not shown) that are positioned at a side surface (not shown). The one or more buttons 261 of the target apparatus 200 may include only the home button 261a. The one or more buttons 261 of the target apparatus 200 may be embodied as a physical button. The one or more buttons 261 of the target apparatus 200 may also be embodied as a touch button at a bezel of an external side of the touchscreen 290. In addition, the one or more buttons 261 of the target apparatus 200 may be displayed as a text, an image, or an icon on the touchscreen 290.

The microphone 262 may receive a voice or a sound from an external source and may generate an electrical signal, according to control by the control unit 210. The electrical signal generated by the microphone 262 may be converted via an audio codec and may be stored in the storage unit 275 or may be output via the speaker 263. The microphone 262 may be positioned at one or more places on the front surface, the side surface, and the rear surface of the target apparatus 200. Alternatively, the microphone 262 may be positioned at one or more places only on the side surface of the target apparatus 200.

The speaker 263 may externally output, by control of the control unit 210, sounds that correspond to various signals (e.g., a wireless signal, a broadcasting signal, an audio source, a video file, or image capturing) of the mobile communication unit 220, the sub-communication unit 230, the multimedia unit 240, or the camera 250 by using an audio codec.

The speaker 263 may output a sound (e.g., a touch manipulation sound that corresponds to inputting a telephone number or an image-capturing button manipulation sound) that corresponds to a function performed by the target apparatus 200. One or more speakers 263 may be positioned at the front surface, the side surface, and/or the rear surface of the target apparatus 200. A plurality of speakers may be positioned at the front surface of the target apparatus 200. A speaker may be positioned at each of the front surface and the rear surface of the target apparatus 200. For example, the speaker 263 may be positioned at the front surface of the target apparatus 200 and a plurality of speakers (not shown) may be positioned at the rear surface of the target apparatus 200. Further, a plurality of speakers may be positioned at the side surface. The target apparatus 200 having an additional speaker (not shown) positioned at its side surface may provide, to a user, a sound effect different from that of a portable apparatus (not shown) having speakers positioned at its front surface and rear surface.

In the present exemplary embodiment, the speaker 263 may reproduce, by control of the control unit 210, acoustic feedback so as to correspond to the switch of the wireless connection with the external apparatus 300 and an output of the content to the external apparatus 300.

The vibration motor 264 may convert, by control of the control unit 210, an electrical signal into a mechanical vibration. The vibration motor 264 may include a linear vibration motor, a bar-type vibration motor, a coin-type vibration motor, or a piezoelectric element vibration motor. For example, when a voice call request is received from another portable apparatus (not shown), the vibration motor 264 of the target apparatus 200 in a vibration mode may operate according to control by the control unit 210. The target apparatus 200 may include one or more vibration motors 264. The vibration motor 264 may vibrate the target apparatus 200 or may vibrate only a portion of the target apparatus 200.

In the present exemplary embodiment, the vibration motor 264 may reproduce, by control of the control unit 210, a tactile feedback so as to correspond to the switch of the wireless connection with the external apparatus 300 and the output of the content to the external apparatus 300.

The connector 265 may be used as an interface for connecting the target apparatus 200 to an external apparatus (not shown) or a power source (not shown). According to control by the control unit 210, the target apparatus 200 may transmit data stored in the storage unit 275 to the external apparatus (not shown) via a wire cable connected to the connector 265 or may receive data from the external apparatus (not shown). The target apparatus 200 may receive power from the power source (not shown) or may charge a battery (not shown) via a wire cable connected to the connector 265. The target apparatus 200 may be connected to an external accessory (e.g., a keyboard dock (not shown)) via the connector 265.

The keypad 266 may receive, from a user, an input for controlling the target apparatus 200. The keypad 266 may include a physical keypad (not shown) that is arranged at the front surface of the target apparatus 200, a virtual keypad (not shown) that is displayed on the touchscreen 290, and a physical keypad (not shown) that is connectable in a wireless or wired manner. However, the physical keypad (not shown) that is arranged at the front surface of the target apparatus 200 may be omitted, according to performance or a structure of the target apparatus 200.

The input pen 267 may touch or select an object (e.g., a menu, a text, an image, a video, a diagram, an icon, and a shortcut icon) displayed on a home screen 291 of the touchscreen 290 of the target apparatus 200 or screens (e.g., a memo screen, a notepad screen, a calendar screen, etc.) of writing/drawing applications. The input pen 267 may touch or select content (e.g., a text file, an image file, an audio file, a video file, or a webpage) displayed on the touchscreen 290 of the target apparatus 200 or the screens of the writing/drawing applications. The input pen 267 may perform handwriting on the screen (e.g., the memo screen) of the writing application or may perform drawing, painting, or sketching on the screen (e.g., a canvas screen) of the drawing application displayed on the touchscreen 290 of the target apparatus 200.

The input pen 267 may input a text or the like by touching the touchscreen 290 or a virtual keypad displayed on the touchscreen 290 that is a capacitive-type touchscreen, a resistive-type touchscreen, or an electromagnetic resonance (EMR)-type touchscreen. The input pen 267 may include a stylus pen or a haptic pen (not shown) having an embedded vibration device (e.g., an actuator or a vibration motor) that vibrates. The input pen 267 may operate (e.g., vibrate) the vibration device, according to not only control information that is received by the target apparatus 200 but also sensing information that is detected by a sensor (e.g., an acceleration sensor (not shown)) embedded in the input pen 267.

When the input pen 267 is withdrawn from an insertion hole (not shown), the control unit 210 may execute a preset writing/drawing application and may display a screen (not shown) of the writing/drawing application on the touchscreen 290.

The input pen 267 may include a finger of the user. For example, drawing may be input, by the finger of the user, to an application that is displayed on a capacitive-type touchscreen or a resistive-type touchscreen.

In a case where writing or drawing is input, by the finger of the user, to the application that is displayed on the capacitive-type touchscreen or the resistive-type touchscreen, the control unit 210 may detect a touch by a finger by using the touchscreen 290 and the touchscreen controller 295.

Shapes or structures of the insertion hole and the input pen 267 of the target apparatus 200 may be changed, according to performance or a structure of the target apparatus 200.

The sensor unit 270 may include one or more sensors that detect a status of the target apparatus 200. For example, the sensor unit 270 may include a proximate sensor 271 that detects whether the user approaches the target apparatus 200, an illuminance sensor 272 that detects an amount of light around the target apparatus 200, and a gyroscope sensor 273 that detects a direction of the target apparatus 200 by using rotational inertia. The sensor unit 270 may include an acceleration sensor (not shown) that detects acceleration of three axes (e.g., an X-axis, a Y-axis, and a Z-axis) that are applied to the target apparatus 200, a gravity sensor (not shown) that detects a gravity action direction or an altimeter that detects an altitude by measuring atmospheric pressure.

The sensor unit 270 may measure motional acceleration and gravitational acceleration of the target apparatus 200 by using the one or more sensors. The sensor unit 270 may further include a fingerprint sensor (not shown) that detects a fingerprint of a user, or a cardiac sensor (not shown) that detects a heartbeat of the user.

The one or more sensors included in the sensor unit 270 detect a status of the target apparatus 200, generate an electrical signal corresponding to a detection result, and transmit the electrical signal to the control unit 210. In addition, the one or more sensors included in the sensor unit 270 may be added or omitted, according to performance of the target apparatus 200.

The storage unit 275 may store, by control of the control unit 210, signals or data that is input and output so as to correspond to operations of the mobile communication unit 220, the sub-communication unit 230, the multimedia unit 240, the camera 250, the GPS 255, the I/O unit 260, the sensor unit 270, the touchscreen 290, and the touchscreen controller 295. The storage unit 275 may store a control program for a control operation of the target apparatus 200 or the control unit 210, GUIs related to applications that are received from a manufacturer or an external source, images for providing the GUIs, user information, documents, databases, or related data.

The power supplier 280 may supply, by control of the control unit 210, power to the internal elements 220 through 275 of the target apparatus 200. The power supplier 280 may supply, by control of the control unit 210, power to the target apparatus 200. The power is received from an external power source (not shown) via a wire cable (not shown) connected to the connector 265. The power supplier 280 may supply, by control of the control unit 210, power to one or more batteries (not shown) and may charge the one or more batteries. The one or more batteries may be positioned between the touchscreen 290 at the front surface and a cover over the rear surface.

When the one or more batteries of the target apparatus 200 are lithium ion batteries, the control unit 210 may protect the one or more batteries from overcharge, overdischarge, overcurrent, or short-circuit, by using a protection circuit mode (PCM) circuit (not shown). When the one or more batteries of the target apparatus 200 are gel-state lithium polymer batteries having a viscosity higher than that of the lithium ion batteries, the target apparatus 200 may include a PCM circuit that is simpler than the PCM circuit for the lithium ion batteries (The PCM circuit may be included in the power supplier 280 or may be embodied in a battery (not shown)).

The power supplier 280 may wirelessly charge (e.g., by magnetic resonance, electromagnetic waves, or magnetic induction) the one or more batteries, according to control by the control unit 210.

The touchscreen 290 includes a touch panel (not shown) for receiving a touch input, and a display panel (not shown) for a screen display. The touchscreen 290 may provide, to the user, GUIs that correspond to various services (e.g., a voice call, a video call, data transmission, broadcasting reception, an image-capturing operation, video viewing, execution of an application, etc.). The touchscreen 290 transmits, to the touchscreen controller 295, an analog signal that corresponds to a single touch or multiple touches that are input via a home screen, a lock screen, or a GUI. The touchscreen 290 may receive an input of the single touch or the multiple touches via a body part (e.g. a finger or a thumb) of the user, or the input pen 267.

The display panel includes a plurality of pixels and displays an image by using the pixels. For example, the display panel may include a liquid crystal display (LCD) panel, an OLED panel, an LED panel, or the like. The display panel may display various operational statuses of the target apparatus 200, and various images and a plurality of objects that occur according to executing an application or a service.

In one or more exemplary embodiments, the term "touch" includes both direct and non-direct contacts between the body part of the user and the touchscreen 290 or between the input pen 267 and the touchscreen 290. For example, the non-direct contact may include hovering the body part of the user or the input pen 267 a distance equal to or less than 50 nm from the touchscreen 290. A distance of the non-direct contact that is detectable by the touchscreen 290 may be changed, according to performance or a structure of the target apparatus 200.

The touchscreen 290 may be embodied as a resistive-type touchscreen, a capacitive-type touchscreen, an infrared-type touchscreen, or an acoustic wave-type touchscreen.

The touchscreen 290 may be embodied as an EMR-type touchscreen. The EMR-type touchscreen may further include a separate EMR-type touch panel (not shown) so as to receive an input via an input pen (not shown) having a resonance circuit that resonates with an EMR-type loop coil.

The touchscreen controller 295 converts the analog signal, which corresponds to the single touch or the multiple touches received via the touchscreen 290, into a digital signal and transmits the digital signal to the control unit 210. The control unit 210 may calculate coordinates of X and Y-axes corresponding to a touch location on the touchscreen 290, by using the digital signal received from the touchscreen controller 295.

The control unit 210 may control the touchscreen 290 by using the digital signal received from the touchscreen controller 295. For example, in response to the input touch, the control unit 210 may differently display a shortcut icon (e.g., an icon 293*a* shown in FIG. 1) from another shortcut icon (not shown) that are displayed on the touchscreen 290, or may execute an application (e.g., a video player application) corresponding to a selected shortcut icon (e.g., the icon 293*a* shown in FIG. 1) and may display a screen of the application on the touchscreen 290.

The touchscreen controller 295 may be arranged as one touchscreen controller 295 or a plurality of touchscreen controllers 295. The touchscreen controller 295 may be included in the control unit 210 so as to correspond to performance or a structure of the target apparatus 200.

The touchscreen controller 295 converts an analog signal into a digital signal and transmits the digital signal to the control unit 210. The analog signal corresponds to a touch received via the EMR-type touchscreen and is different from the analog signal that corresponds to the signal touch or the multiple touches and is received via the touchscreen 290. The control unit 210 may calculate X and Y coordinates corresponding to a touch location on the EMR-type touchscreen, by using the digital signal received from the touchscreen controller 295. In the EMR-type touchscreen, an EMR-type touchscreen controller (not shown) may be used.

While the target apparatus 200 shown in FIG. 1 has only one touchscreen, one or more exemplary embodiments are not limited thereto and the target apparatus 200 may have a plurality of touchscreens. The plurality of touchscreens may be respectively arranged in housings and may be connected to each other by using hinges, or may be arranged in a flexible housing. Each of the plurality of touchscreens may include a display panel and a touch panel.

Referring to FIGS. 1, 2A, and 2B, the host apparatus 100 (e.g., the display apparatus) and the target apparatus 200 are different from each other, but one of two same-type apparatuses (e.g., tablet apparatuses 1 and 2) may operate as the host apparatus 100 and the other one may operate as the target apparatus 200.

At least one of the elements of the target apparatus 200 shown in FIG. 2B may be removed or at least one element may be added, according to performance or a structure of the target apparatus 200.

Figure 2C:
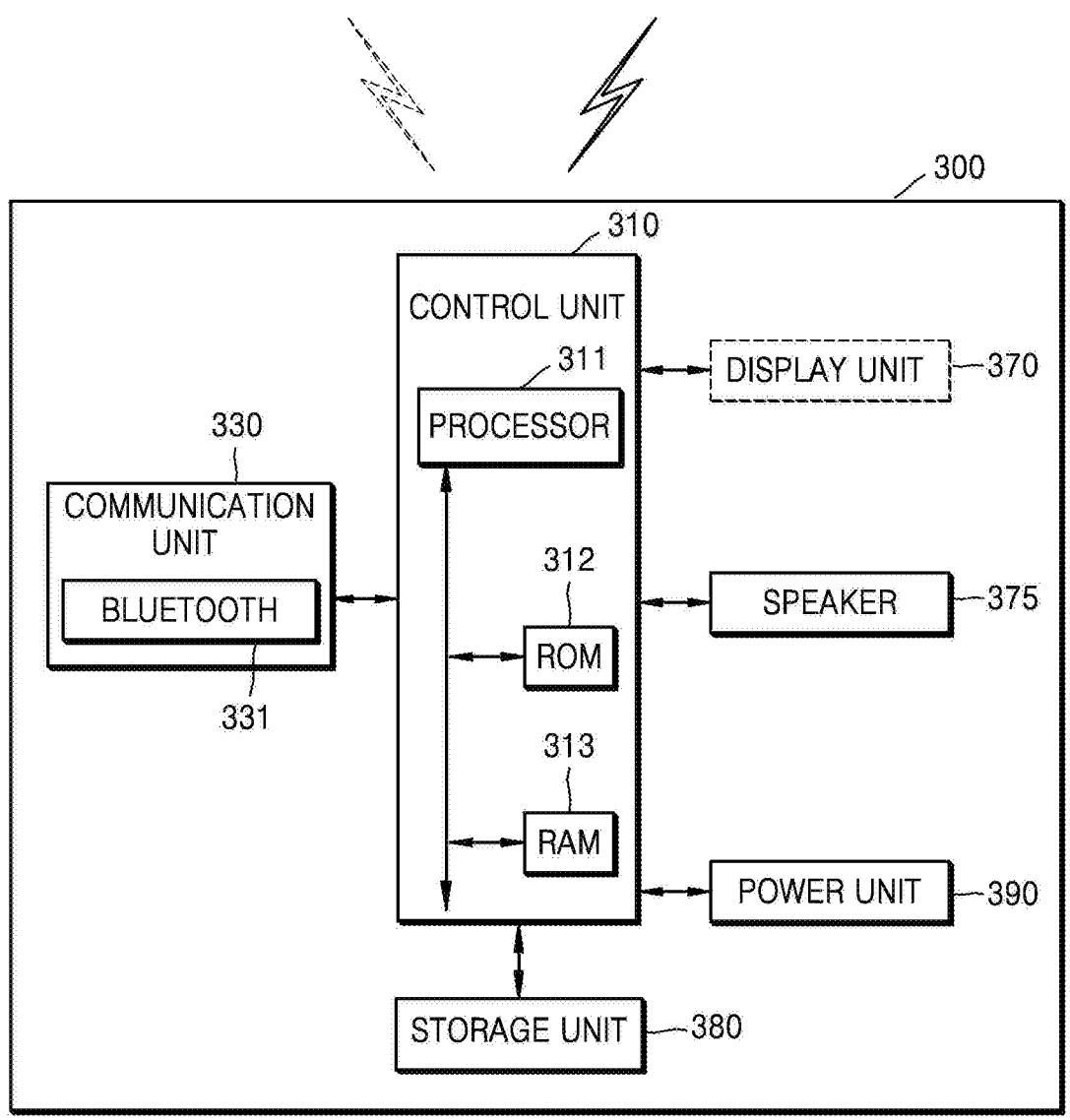
FIG. 2C illustrates a block diagram of the external apparatus, according to an exemplary embodiment.

FIG. 2C illustrates a block diagram of the external apparatus 300, according to an exemplary embodiment.

Referring to FIG. 2C, the external apparatus 300 (e.g., a wireless audio apparatus) is connected to one of the host apparatus 100 and the target apparatus 200 in a wireless manner (e.g., Bluetooth 331, radio frequency transceiver RF transceiver, etc.) via a communication unit 330. The external apparatus 300 may output audio received from one of the host apparatus 100 and the target apparatus 200. The external apparatus 300 may output audio streaming received from the host apparatus 100 or the target apparatus 200 that is connected in a wireless manner with the external apparatus 300.

The external apparatus 300 may include a control unit 310, the communication unit 330, a display unit 370, a speaker 375 (also, referred to as 'embedded speaker 375), a storage unit 380, or a power unit 390.

The control unit 310 includes a processor 311. The control unit 310 may include the processor 311 and a ROM 312 that stores a control program for controlling the external apparatus 300. The control unit 310 may include the processor 311, the ROM 312, and a RAM 310 used to store a signal or data received from an external source of the external apparatus 300 or used as a storage domain for various tasks that are performed in the external apparatus 300. The control unit 310 may include an audio codec module (not shown) and/or a video codec module (not shown).

The control unit 310 controls all operations of the external apparatus 300 and a flow of signals between internal elements 330 through 380 of the external apparatus 300, and performs a data processing function. The control unit 310 controls power that is supplied from the power unit 390 to the internal elements 330 through 380.

The control unit 310 may output the received audio via the embedded speaker 375. In addition, the control unit 310 may output the received audio via an additional speaker (not shown) that is connected via the communication unit 330 or an I/O unit (not shown).

The control unit 310 may control the external apparatus 300 to be connected to a second electronic apparatus and to output content received from the second electronic apparatus; to receive a request for changing reception of the content from the second electronic apparatus to reception of the content from a first electronic apparatus; to transmit a response to the request to the second electronic apparatus; and to be connected to the first electronic apparatus and to output the content received from the first electronic apparatus.

The control unit 310 may control the external apparatus 300 to be selectively connected to one of the first electronic apparatus and the second electronic apparatus, according to the output of the content.

The control unit 310 may control the external apparatus 300 to output the content by using at least one of the display unit 370 and the speaker 375 so as to correspond to the content.

The communication unit 330 may be connected in a wireless manner with one of the host apparatus 100 and the target apparatus 200, according to control by the control unit 310. The communication unit 330 may further include other short-range communication (e.g., NFC (not shown), BLE (not shown), etc.), in addition to the Bluetooth 331. The communication unit 330 may receive, by control of the control unit 310, a remote adjustment signal (including a control signal) of a remote controller (not shown). The remote adjustment signal may be implemented as a Bluetooth-type remote adjustment signal or a RF-type remote adjustment signal.

The control unit 310 may receive audio and/or video corresponding to various contents from one of the host apparatus 100 and the target apparatus 200 connected via the communication unit 330. The control unit 310 may be connected in a wireless manner with to another external apparatus via the communication unit 330.

The display unit 370 may display, by control of the control unit 310, video information or text information (e.g., a music title, etc.) corresponding to the received content. For example, the display unit 370 may include an LCD, an OLED, a plasma display panel (PDP), or a vacuum fluorescent display (VFD). Video information and/or text information may vary according to the display techniques.

In the present exemplary embodiment, the display unit 370 may output, by control of the control unit 310, a visual feedback so as to correspond to connection with one of the host apparatus 100 and the target apparatus 200 or the output of the content.

The embedded speaker 375 outputs, by control of the control unit 310, audio corresponding to the received content. The embedded speaker 375 may output the audio (e.g., a voice, music, a sound, etc.) received via the communication unit 330. The embedded speaker 375 may be implemented as 1 channel, 2 channels, or 2.1 channels. In addition, the embedded speaker 375 may be implemented as, but is not limited to, 4 channels, 4.1 channels, 5.1 channels, 6.1 channels, 7.1 channels, 9.1 channels, or 11.2 channels.

The control unit 310 may up-mix the received audio (e.g., 2.0-channel audio) and may output the up-mixed audio to 4 channel, 5 channel, 5.1 channel, or 7.1 channel speakers (i.e., the embedded speaker 375 and the additional speaker). Further, the control unit 310 may down-mix the received audio (e.g., a 7.1-channel audio) and may output the down-mixed audio to 2 channel, 2.1 channel, or 5.1 channel speaker (i.e., the embedded speaker 375). The control unit 310 may output the received audio, in consideration of the number of the speakers 375 and the number of the additional speakers that correspond to the audio.

The control unit 310 may provide various audio output effects (e.g., a concert hall effect, an orchestra hall effect, etc.) to a user, according to the number of the embedded speakers 375.

The embedded speaker 375 may output, by control of the control unit 310, audio stored in the storage unit 380.

In the present exemplary embodiment, the embedded speaker 375 may output, by control of the control unit 310, acoustic feedback that corresponds to connection with one of the host apparatus 100 and the target apparatus 200 or the output of the content.

The storage unit 380 may store various data and a control program for driving and controlling the external apparatus 300, according to control by the control unit 310. The storage unit 380 may store input/output signals or data that correspond to driving the communication unit 330, the display unit 370, the embedded speaker 375, and the power unit 390.

The storage unit 380 may include a non-volatile memory, a volatile memory, a HDD, or a SSD.

The power unit 390 supplies, by control of the control unit 310, power, which is input from an external power source, to the internal elements 330 through 380 of the external apparatus 300. The power unit 390 may supply, by control of the control unit 310, power to the internal elements 330 through 380. The power is output from one or more batteries (not shown) arranged in the external apparatus 300.

At least one of the elements 330 through 380 of the external apparatus 300 shown in FIGS. 1 and 2C may be removed or at least one element may be added thereto, according to performances of the external apparatus 300. However, the positions of the elements 330 through 380 may be changed to correspond to performance or a structure of the external apparatus 300.

Figure 3:
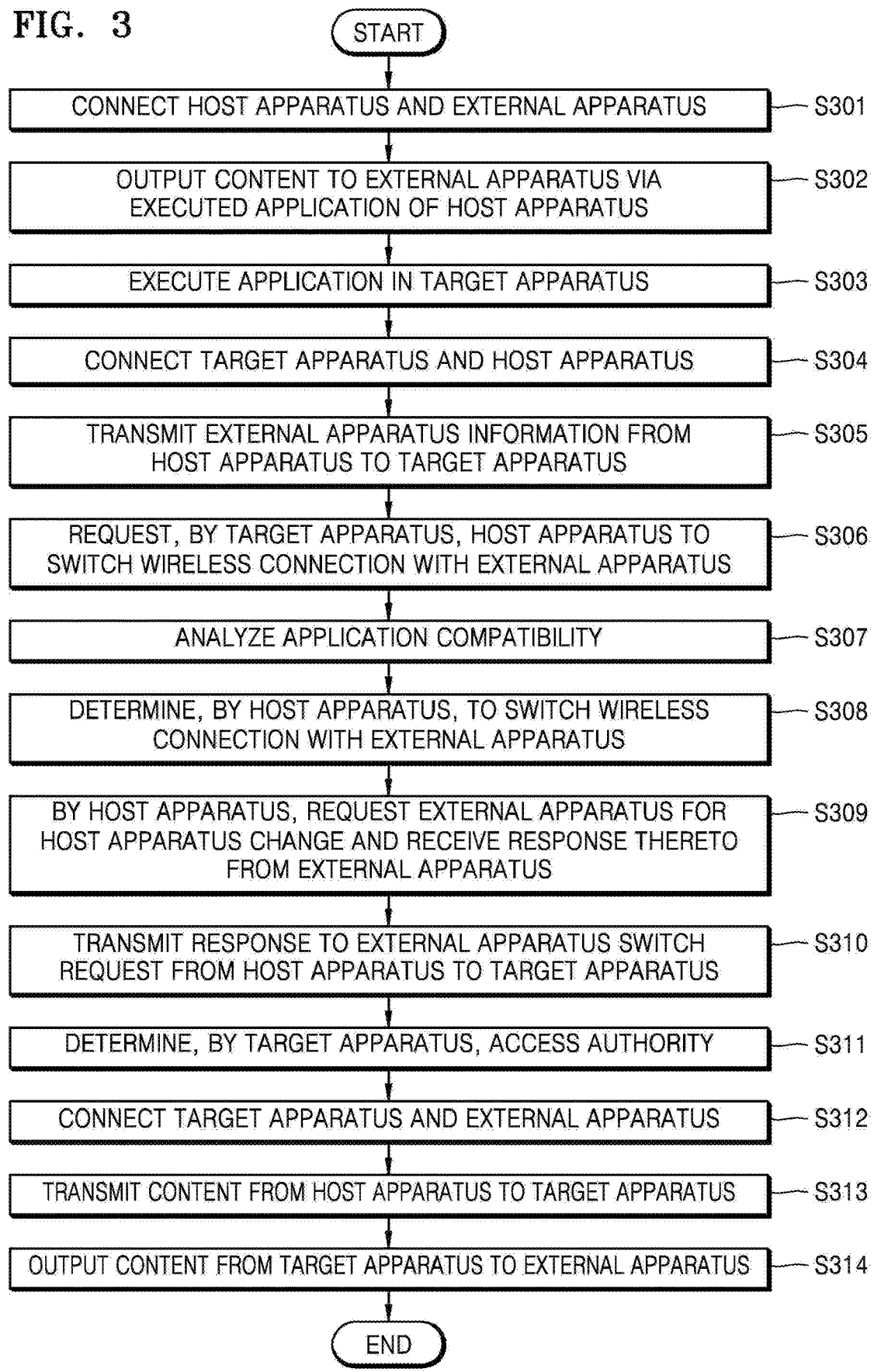
FIG. 3 illustrates a flowchart illustrating a method of outputting content, the method performed by the host apparatus, the target apparatus, and the external apparatus, according to an exemplary embodiment.

FIG. 3 illustrates a flowchart illustrating a method of outputting content, the method performed by the host apparatus 100, the target apparatus 200, and the external apparatus 300, according to an exemplary embodiment.

Figure 4:
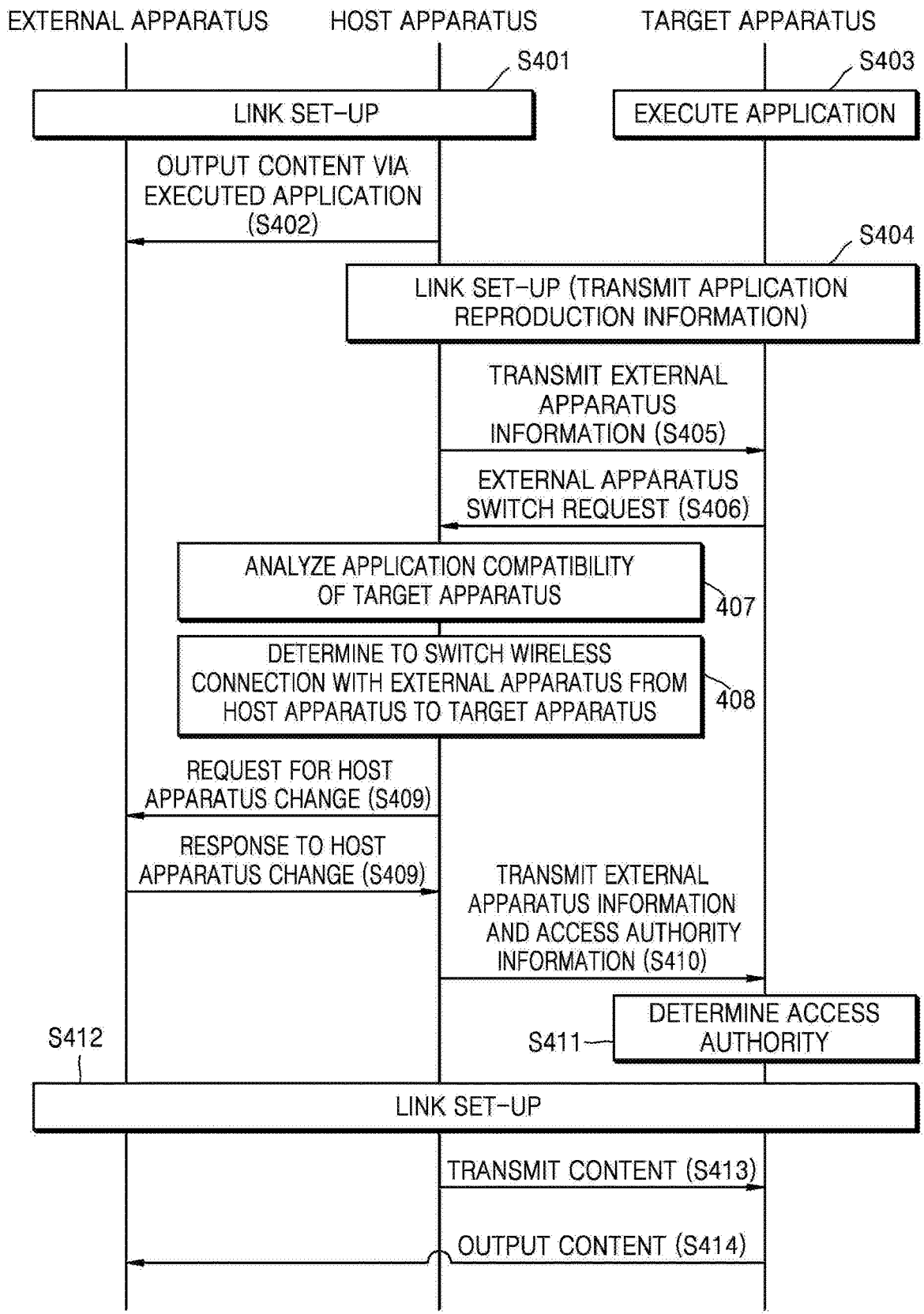
FIG. 4 illustrates a sequence diagram illustrating the method of outputting content, the method performed by the host apparatus, the target apparatus, and the external apparatus, according to an exemplary embodiment.

FIG. 4 illustrates a sequence diagram illustrating the method of outputting content, the method performed by the host apparatus 100, the target apparatus 200, and the external apparatus 300, according to an exemplary embodiment.

FIGS. 5A through 5D illustrate the method of outputting content, the method performed by the host apparatus 100, the target apparatus 200, and the external apparatus 300, according to an exemplary embodiment.

In operation S301 of FIG. 3, the host apparatus 100 and the external apparatus 300 are connected (operation S401).

The control unit 110 of the host apparatus 100 (e.g., a display apparatus) may search for an adjacent electronic apparatus by using the communication unit 130. The external apparatus 300 may be selected by a user (e.g., by a user's touch, etc.) from a search list (not shown) corresponding to a search result displayed on a screen of the host apparatus 100. The control unit 110 of the host apparatus 100 may control the host apparatus 100 to be connected, by using the communication unit 130, in a wireless manner with the communication unit 330 of the selected external apparatus 300. According to the user, the control unit 110 of the host apparatus 100 may select at least one of various profiles (e.g., an advanced audio distribution profile (A2DP), a hands-free profile (HFP), etc.) that are supported by the external apparatus 300. The control unit 310 of the external apparatus 300 may be connected in a wireless manner with the communication unit 130 of the host apparatus 100 by using the communication unit 330.

The control unit 110 of the host apparatus 100 may store apparatus information of the external apparatus 300 (hereinafter, referred to as "external apparatus information") in the storage unit 180. The stored external apparatus information may include wireless connection information (e.g., a service set identification (SSID), an internet protocol (IP) address, a media access control address (MAC address), a channel number, a security key, etc.), the number of the external apparatuses 300, a product name of the external apparatus 300, an identifier of the external apparatus 300, a MAC address of the external apparatus 300, a type of the external apparatus 300, a profile of the selected external apparatus 300, a communication method of the external apparatus 300, or the like.

The control unit 310 of the external apparatus 300 may store information defining a wirelessly-connected display apparatus as the host apparatus 100 in the storage unit 380. Further, the control unit 310 of the external apparatus 300 may store apparatus information of the host apparatus 100 (hereinafter, referred to as "host apparatus information") in the storage unit 380. The stored host apparatus information may include wireless connection information (e.g., an SSID, an IP address, a MAC address, a channel number, a security key, etc.), a product name of the host apparatus 100, an identifier of the host apparatus 100, an MAC address of the host apparatus 100, a type of the host apparatus 100, a profile of the selected host apparatus 100, a communication method of the host apparatus 100, or the like.

In operation S302 of FIG. 3, the host apparatus 100 outputs content, which is executed in an application, to the external apparatus 300 (operation S402).

The control unit 110 of the host apparatus 100 may output the content reproduced in the application to the external apparatus 300 that is connected with the host apparatus 100. According to the user or a preset condition (e.g., to display a news channel at 10 a.m., etc.), the control unit 110 of the host apparatus 100 may execute the application. In the executed application, the content is reproduced (e.g., the content is displayed on a screen, is transmitted via a communication unit, or is output via a speaker). Various contents may be reproduced in applications according to types of the applications.

The control unit 310 of the external apparatus 300 may output the content received via the communication unit 330. For example, when the received content is video, the control unit 310 of the external apparatus 300 may output the content by using the display unit 370 and the speaker 375. When the received content is audio, the control unit 310 of the external apparatus 300 may output the content via the speaker 375.

When a type of the content is a video file, the control unit 110 of the host apparatus 100 may display a screen by using a first video player application 500 (refer to FIG. 5A) and may output audio via the speaker 176. The control unit 110 of the host apparatus 100 may output, via the communication unit 130, a video (including audio) or only the audio included in the video to the external apparatus 300.

When a type of the content is an audio file, the control unit 110 of the host apparatus 100 may display a screen (e.g., when the audio file includes an image to be displayed) by using an audio player application (not shown), and may output audio via the speaker 176. The control unit 110 of the host apparatus 100 may output, via the communication unit 130, the audio (including the image) or audio to the wirelessly-connected external apparatus 300.

The executed application may include a word processor application, a spread sheet application, a contacts application, a calendar application, a memo application, an alarm application, an SNS application, a chatting application, a map application, a music player application, or a video player application.

The control unit 110 of the host apparatus 100 may store, in the storage unit 180, application information about a first application (e.g., a first video player application) corresponding to the executed first video player application 500. The stored application information may include identification information (e.g., a product name, an identifier, a classification code, etc.) for identifying the first application, application execution state information (e.g., a reproduction position of content, a current level of content (e.g., as in a game), etc.) at a transmission time of the application information, external apparatus information (e.g., the number of external apparatuses, identifiers of the external apparatuses, product names of the external apparatuses, types of the external apparatuses, etc.) about the external apparatuses that interoperate with an application of the target apparatus 200, or the like.

Figure 5A:
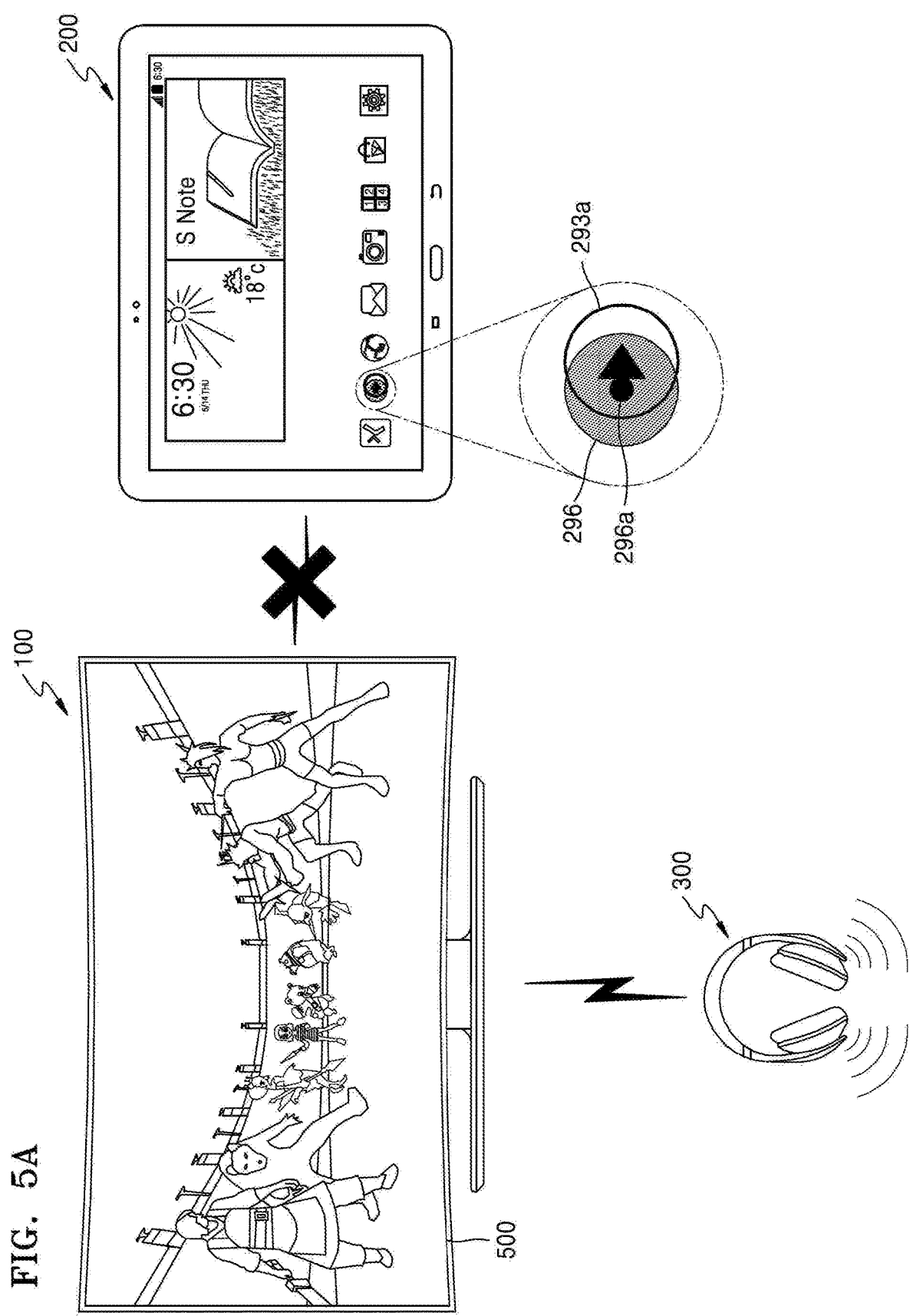

Referring to FIG. 5A, the control unit 110 of the host apparatus 100 according to the present exemplary embodiment may transmit, to the external apparatus 300, audio data included in a video file reproduced in the first video player application 500. The control unit 310 of the external apparatus 300 may output the received audio data via the speaker 375. The control unit 110 of the host apparatus 100 may control the host apparatus 100 to output the video file reproduced in the first video player application 500 via the display unit 170 and/or the audio output unit 175.

The host apparatus 100 and the target apparatus 200 are not connected in a wireless manner. However, the host apparatus 100 and the external apparatus 300 are connected in a wireless manner with each other.

In operation S303 of FIG. 3, the application is executed in the target apparatus 200 (operation S403).

Referring to FIG. 5A, a user performs a first touch 296 on the shortcut icon 293a on a screen of the target apparatus 200 (e.g., a tablet apparatus). The shortcut icon 293a corresponds to a second video player application. The control unit 210 may detect the first touch 296 by using the touchscreen 290 and the touchscreen controller 295. The control unit 210 may calculate a first touch position 296a (e.g., X1 and Y1 coordinates) corresponding to the first touch 296, by using an electrical signal received from the touchscreen controller 295.

The control unit 210 may store first touch position information corresponding to the first touch position 296a in the storage unit 275. The first touch position information may include a touch identifier for history management, a touched position, a touch detection time, or touch information (e.g., a touch pressure, a touch direction, touch duration, etc.).

The control unit 210 may detect first hovering (not shown) by using the touchscreen 290 and the touchscreen controller 295. The control unit 210 may calculate a first hovering position (not shown, e.g., X11 and Y11 coordinates) corresponding to the first hovering, by using an electrical signal received from the touchscreen controller 295.

The control unit 210 may store first hovering position information corresponding to the first hovering position in the storage unit 275. The stored first hovering position information may include a hovering detection position, a hovering detection time, or hovering information (e.g., a hovering height (h), a hovering direction, hovering duration, etc.).

Figure 5B:
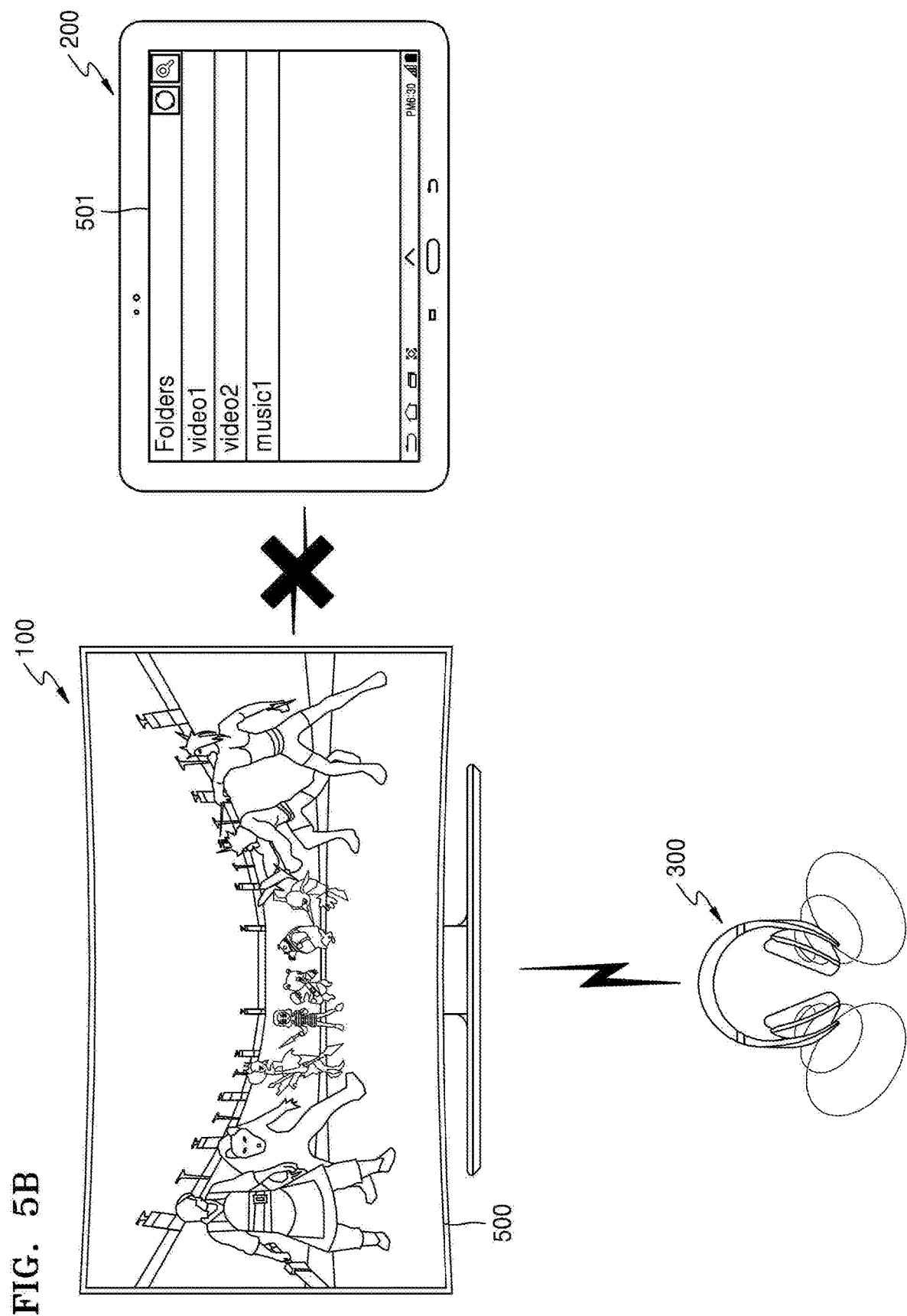

Referring to FIG. 5B, the control unit 210 of the target apparatus 200 may execute a second video player application 501, according to the first touch 296. Folders (e.g., a video1 folder, a video2 folder, and a music1 folder) storing various contents (e.g., video files) that are executable in the executed second video player application 501 are displayed. When the user selects content to be reproduced from one folder, the control unit 210 of the target apparatus 200 may display the content on a window of the second video player application 501, and may output audio of the content via the speaker 275.

In some exemplary embodiments, the second video player application 501 may not reproduce the content or may reproduce the content.

When the second video player application 501 is executed in the target apparatus 200, the target apparatus 200 and the host apparatus 100 are not connected in a wireless manner with each other. The host apparatus 100 and the external apparatus 300 are connected in a wireless manner with each other.

In operation S304 of FIG. 3, the host apparatus 100 and the target apparatus 200 are connected (operation S404).

Figure 5C:
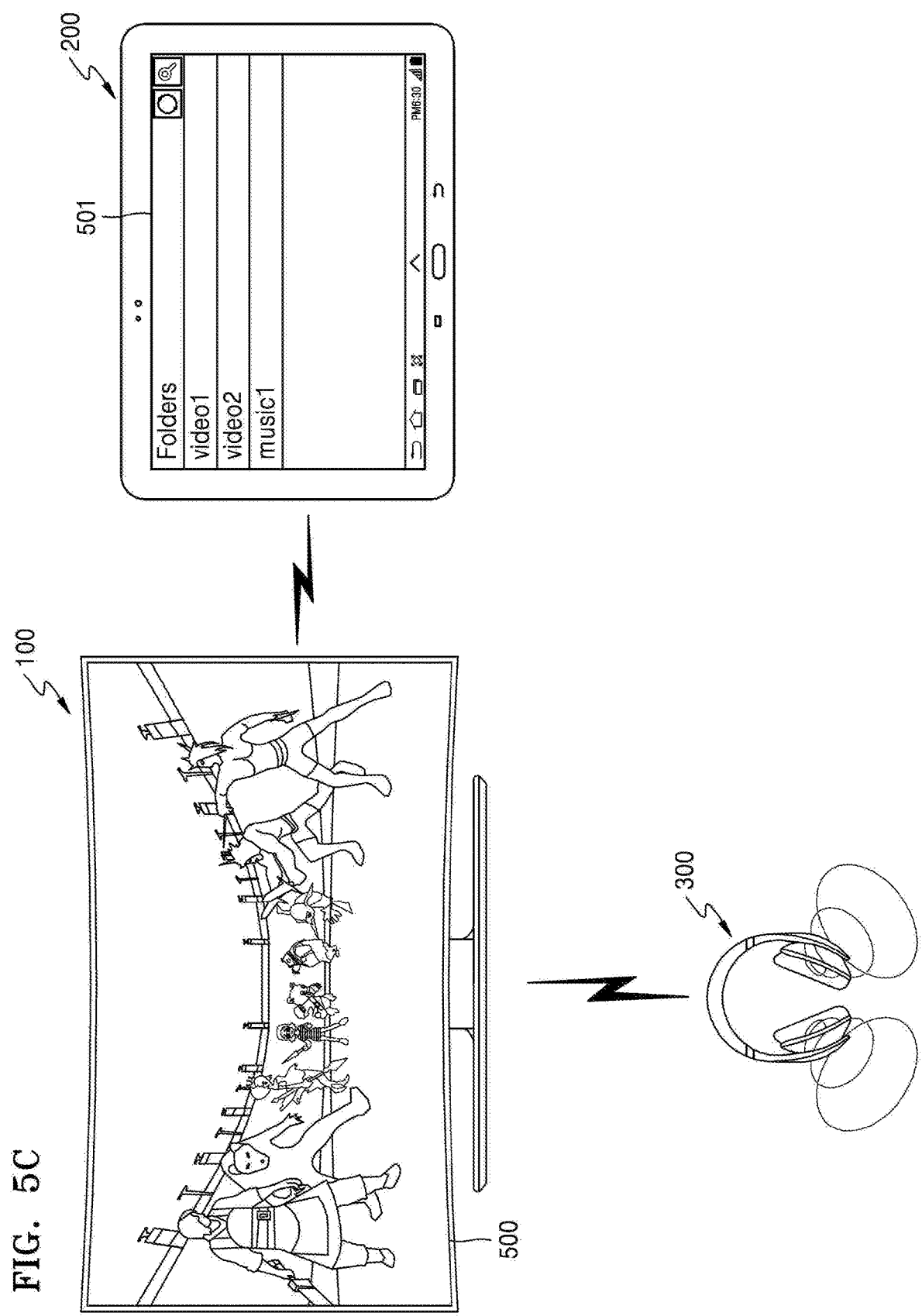

Referring to FIG. 5C, when the second video player application 501 is executed in the target apparatus 200, the control unit 210 of the target apparatus 200 may search for an adjacent host apparatus by using the mobile communication unit 220 and/or the sub-communication unit 230. The host apparatus 100 that is a connection target may be selected by a user from a search list (not shown) corresponding to a search result displayed on a screen of the target apparatus 200. According to the selection by the user, the control unit 210 of the target apparatus 200 may control the target apparatus 200 to be connected in a wireless manner with the host apparatus 100, by using the mobile communication unit 220 and/or the sub-communication unit 230.

The control unit 210 of the target apparatus 200 may store the apparatus information of the host apparatus 100 in the storage unit 275, according to the connection with the host apparatus 100. The stored apparatus information of the host apparatus 100 may include wireless connection information (e.g., an SSID, an IP address, a MAC address, a channel number, a security key, etc.), a product name of the host apparatus 100, an identifier of the host apparatus 100, a MAC address of the host apparatus 100, a type of the host apparatus 100, a profile of the host apparatus 100, a communication method of the host apparatus 100, or the like.

Similarly, the control unit 110 of the host apparatus 100 may search for an adjacent electronic apparatus by using the communication unit 130. The target apparatus 200 may be selected by a user from a search list (not shown) corresponding to a search result displayed on a screen of the host apparatus 100. The control unit 110 of the host apparatus 100 may control the host apparatus 100 to be connected, by using the communication unit 130, in a wireless manner with the mobile communication unit 220 and/or the sub-communication unit 230 of the selected target apparatus 200.

The control unit 110 of the host apparatus 100 may store apparatus information of the target apparatus 200 in the storage unit 180, so as to correspond to the connection with the target apparatus 200. The stored apparatus information of the target apparatus 200 may include wireless connection information (e.g., an SSID, an IP address, a MAC address, a channel number, a security key, etc.), a product name of the target apparatus 200, an identifier of the target apparatus 200, a MAC address of the target apparatus 200, a type of the target apparatus 200, a profile of the target apparatus 200, a communication method of the target apparatus 200, or the like.

When the target apparatus 200 and the host apparatus 100 are connected, the control unit 210 of the target apparatus 200 may transmit, to the host apparatus 100, second application information corresponding to the executed second video player application 501 by using the mobile communication unit 220 and/or the sub-communication unit 230. When the target apparatus 200 and the host apparatus 100 are connected, the control unit 210 of the target apparatus 200 may transmit, to the host apparatus 100, second application information corresponding to the executed second video player application 501 by using the mobile communication unit 220 and/or the sub-communication unit 230 of the selected target apparatus 200, according to selection (e.g., transmission of the second application information to the host apparatus 100) by the user.

For example, the second application information may include identification information (e.g., a product name, an identifier, a classification code, etc.) for identifying the second application (e.g., the second video player application 501), application execution state information (e.g., a reproduction position of content, a current level of content (e.g., as in a game), etc.) at a transmission time of the application information, external apparatus information (e.g., the number of external apparatuses, identifiers of the external apparatuses, product names of the external apparatuses, types of the external apparatuses, etc.) about the external apparatuses that interoperate with an application of the target apparatus 200, or the like.

The control unit 210 of the target apparatus 200 may transmit at one time a package of items (e.g., the identification information, the application execution state information, and the external apparatus information) included in the second application information to the host apparatus 100, or may sequentially transmit the items to the host apparatus 100 according to a determined order.

In operation S305 of FIG. 3, the external apparatus information is transmitted from the host apparatus 100 to the target apparatus 200 (operation S405).

When the target apparatus 200 and the host apparatus 100 are connected, the control unit 110 of the host apparatus 100 may transmit, to the target apparatus 200 and by using the communication unit 130, the external apparatus information (e.g., stored in the storage unit 180 or received from the external apparatus 300) corresponding to the connected external apparatus 300. When the target apparatus 200 and the host apparatus 100 are connected, the control unit 110 of the host apparatus 100 may transmit, to the target apparatus 200 and by using the communication unit 130, the external apparatus information (e.g., stored in the storage unit 180 or received from the external apparatus 300) corresponding to the connected external apparatus 300, according to selection (e.g., transmission of the external apparatus information to the external apparatus 300) by the user. When application information is received from the target apparatus 200, the control unit 110 of the host apparatus 100 may transmit, to the target apparatus 200 and by using the communication unit 130, the external apparatus information (e.g., stored in the storage unit 180 or received from the external apparatus 300) corresponding to the connected external apparatus 300.

The control unit 110 of the host apparatus 100 may transmit all of a plurality of pieces of external apparatus information stored in the storage unit 180 to the target apparatus 200 or may selectively transmit a part of each of the plurality of pieces of external apparatus information stored in the storage unit 180 to the target apparatus 200.

In operation S306 of FIG. 3, the target apparatus 200 requests the host apparatus 100 to switch a wireless connection with the external apparatus 300 (operation S406).

When the application information is transmitted from the target apparatus 200 to the host apparatus 100, the control unit 210 of the target apparatus 200 may request (e.g., by using accessory_req) the host apparatus 100 to switch the wireless connection with the external apparatus 300 that interoperates with the host apparatus 100. According to an exemplary embodiment, the external apparatus 300 may include at least one accessory such as a home theater, a wireless sound-bar, or a wireless headset.

In a case where the external apparatus information is received from the host apparatus 100 so as to correspond to the transmission of the application information from the target apparatus 200 to the host apparatus 100, the control unit 210 of the target apparatus 200 may request (e.g., by using accessory_req) the host apparatus 100 to switch the wireless connection with the external apparatus 300 that interoperates with the host apparatus 100.

Figure 6:
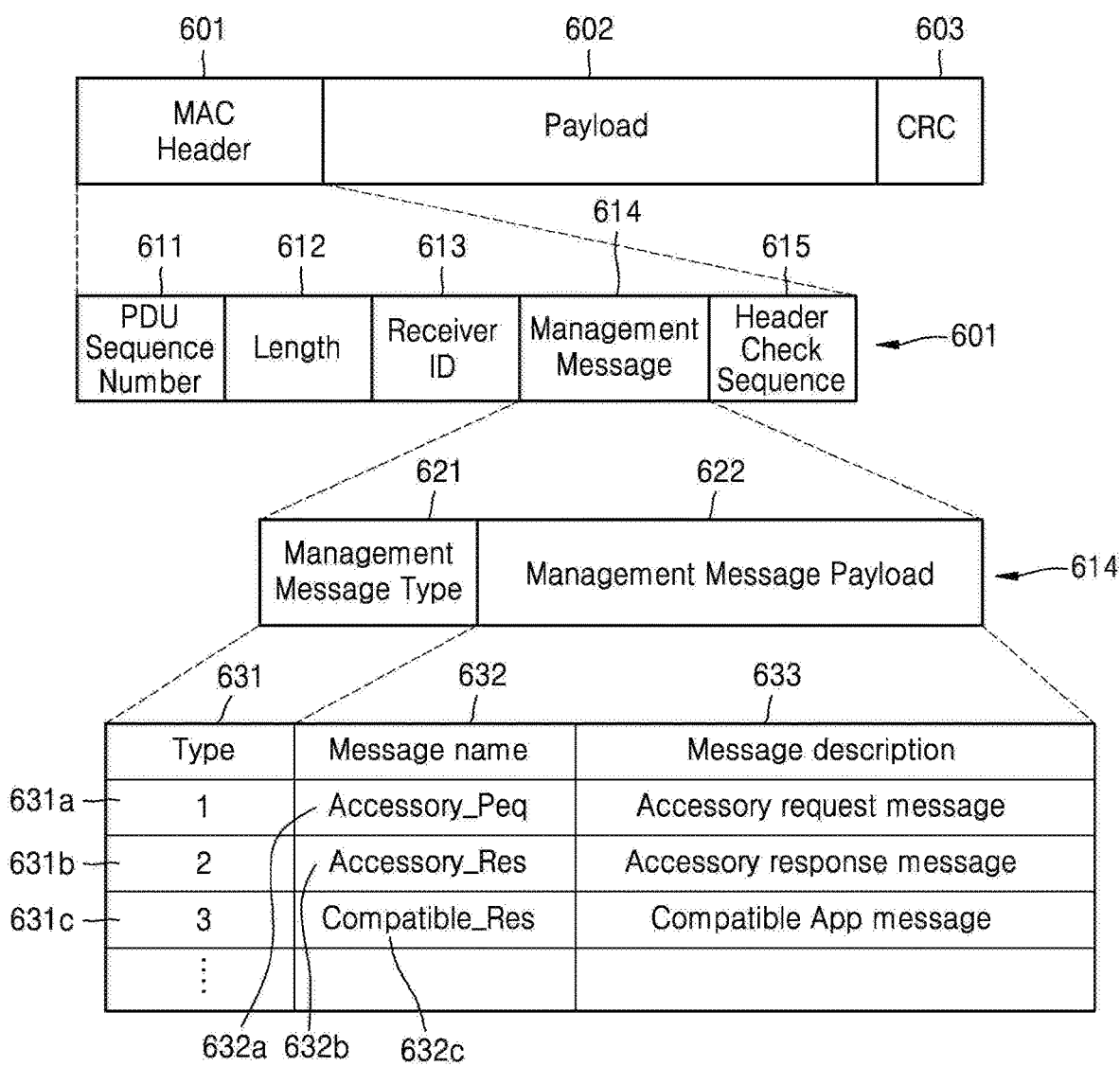
FIG. 6 illustrates a packet format, according to an exemplary embodiment.

Referring to FIG. 6, the control unit 210 of the target apparatus 200 may transmit, to the host apparatus 100, a command (e.g., a control packet) corresponding to the switch of the wireless connection with the external apparatus 300. The control packet that is transmitted via wireless communication has a hierarchical structure (refer to FIG. 6).

Referring to FIG. 6, the control packet may be formed of 3 frames including a MAC header 601 corresponding to a receiver (or a transmitter) address and a length, a payload 602 corresponding to data, and a cyclical redundancy check (CRC) 603 corresponding to transmission error detection. The MAC header 601 may be formed of 5 frames including a protocol data unit (PDU) sequence number 611, a length 612, a receiver ID 613, a management message 614, and a header check sequence 615. The management message 614 may be formed of 2 frames including a management message type 621 and a management message payload 622. The management message type 621 may be formed of one frame including a type 631. The management message payload 622 may be formed of 2 frames including a message name 632 and a message description 633.

In the present exemplary embodiment, the type field 631 may include a type1 631a, a type2 631b, a type3 631c, etc. The message name field 632 may include an accessory switch request message (i.e., accessory_req) 632a corresponding to a message (also, referred to as "external apparatus switch request message") requesting to switch an accessory from the host apparatus 100 to the target apparatus 200, an accessory switch request response message (i.e., accessory_res) 632b corresponding to a response message (also, referred to as "response message to an external apparatus switch request") to the request with respect to switching the accessory from the host apparatus 100 to the target apparatus 200, a compatibility response (i.e., compatible_res) 632c corresponding to a compatible application message, or the like. At least one message name in the message name field 632 may be added, deleted, or changed in one or more exemplary embodiments.

The accessory switch request message 632a may have a format shown in Table 1.

TABLE 1

| Syntax | Size(bit) | Notes |
| --- | --- | --- |
| Accessory_Request_Format( ) { | — | |
| Management message type=n | 4 | |
| Target_Device_ID | 6 | |
| Media info | 8 | 0000: media player1 |
| | | 0001: video player1 |
| | | 0010: video player2 |
| | | 0011: media player2 |
| | | 0100: audio player1 |
| | | . |
| | | . |
| | | . |
| Reserved | 1 | |
| } | — | |

Here, a management message type field (i.e., Management message type) may indicate "1" corresponding to the accessory switch request message 632a (e.g., accessory_req). A target apparatus identifier field (i.e., Target_Device_ID) may indicate an identifier for identifying the target apparatus 200 from among various electronic apparatuses. A media information field (i.e., Media info) may indicate an application that is executed in the target apparatus 200. For example, when the second video player application 501 is executed in the target apparatus 200, the media information field may indicate "0010". The media information field may indicate an application that is installed in the target apparatus 200. For example, if a first media player application, a first video player application, a second video player application, a second media player application, and a first audio player application are installed in the target apparatus 200, the media information field may indicate "0000", "0001", "0010", "0011", and "0100". Further, the media information field may indicate an application capable of executing content (e.g., a video) in the target apparatus 200. For example, when an application of the target apparatus 200 that supports a video is the first media player application, the first video player application, the second video player application, the second media player application, and the first audio player application, the media information field may indicate "0000", "0001", "0010", "0011", and "0100".

The accessory switch request message 632a may include a part of the external apparatus information received from the host apparatus 100. The part of the external apparatus information received from the host apparatus 100 may include an identifier of an external apparatus, a product name of the external apparatus, or connection information of the external apparatus that corresponds to the switching of the accessory.

The accessory switch request message 632a may be stored in the storage unit 275, according to control by the control unit 110 of the host apparatus 100. The control unit 110 of the host apparatus 100 may receive the accessory switch request message 632a from an external source (e.g., a separate server (not shown)) and may store it in the storage unit 275.

When the second application information is transmitted from the target apparatus 200 to the host apparatus 100, the control unit 210 of the target apparatus 200 may request (by using an accessory switch request message) the host apparatus 100 to switch, from the host apparatus 100 to the target apparatus 200, a wireless connection with the external apparatus 300 that interoperates with the host apparatus 100. When the external apparatus information is received from the host apparatus 100 so as to correspond to transmission of the second application information from the target apparatus 200 to the host apparatus 100, the control unit 210 of the target apparatus 200 may request (by using the accessory switch request message) the host apparatus 100 to switch, from the host apparatus 100 to the target apparatus 200, the wireless connection with the external apparatus 300 that interoperates with the host apparatus 100.

When the target apparatus 200 and the host apparatus 100 are connected to each other, the control unit 210 of the target apparatus 200 may transmit at least one of the second application information and media information of the accessory switch request message to the host apparatus 100. For example, the control unit 210 of the target apparatus 200 may transmit only one of the second application information and the media information of the accessory switch request message to the host apparatus 100. Alternatively, the control unit 210 of the target apparatus 200 may transmit all of the second application information and the media information of the accessory switch request message to the host apparatus 100.

When the host apparatus 100 receives all of the second application information and the media information of the accessory switch request message, the control unit 110 of the host apparatus 100 may selectively use the second application information or the media information of the accessory switch request message.

The control unit 210 of the target apparatus 200 may store a transmission history of the accessory switch request message in the storage unit 275. The transmission history of the accessory switch request message that is stored in the storage unit 275 may include an identifier, a transmission time, apparatus information of a receiver (e.g., the host apparatus 100), etc., of the accessory switch request message for a history management.

When the target apparatus 200 and the host apparatus 100 are connected to each other, the host apparatus 100 is also connected in a wireless manner with each of the target apparatus 200 and the external apparatus 300. Here, the target apparatus 200 is not connected in a wireless manner with the external apparatus 300.

In operation S307 of FIG. 3, application compatibility is analyzed (operation S407).

The control unit 110 of the host apparatus 100 analyzes the application compatibility by using the accessory switch request message. The control unit 110 of the host apparatus 100 may compare compatibility between the first video player application 500 executed in the host apparatus 100 and the second video player application 501 set in the media information of the accessory switch request message. The compatibility indicates whether content that is executed in the first video player application 500 is executable in the second video player application 501 of the target apparatus 200. In addition, compatibility may also indicate what the content played or reproduced in a first application may be reproduced or played by a second application.

The control unit 110 of the host apparatus 100 may determine the application compatibility by determining whether a product name of the first video player application 500 is included in media information of the accessory switch request message 632 received from the target apparatus 200. For example, if the media information of the accessory switch request message 632 includes the first video player application 500, the control unit 110 of the host apparatus 100 may determine the first video player application 500 as "compatible". If the media information of the accessory switch request message 632 does not include the first video player application 500, the control unit 110 of the host apparatus 100 may determine the first video player application 500 as "incompatible".

The control unit 110 of the host apparatus 100 may previously store, in the storage unit 180, host apparatus media information corresponding to the media information of the accessory switch request message 632 received from the target apparatus 200. The host apparatus media information may be a list of applications that have compatibility corresponding to content (e.g., a video, an audio, a web, etc.).

The control unit 110 of the host apparatus 100 may determine the application compatibility by determining whether the second video player application 501 is included in the host apparatus media information. The second video player application 501 is included in the media information of the accessory switch request message 632 received from the target apparatus 200. For example, if the second video player application 501 is included in the host apparatus media information, the control unit 110 of the host apparatus 100 may determine the second video player application 501 as "compatible". If the second video player application 501 is not included in the host apparatus media information, the control unit 110 of the host apparatus 100 may determine the second video player application 501 as "incompatible".

The control unit 110 of the host apparatus 100 may determine the application compatibility by determining whether the second application information received from the target apparatus 200 is included in the host apparatus media information. For example, if the host apparatus media information includes the second application information (e.g., an identifier, a product name, a classification code, etc.

of the second application), the control unit 110 of the host apparatus 100 may determine the second video player application 501 as "compatible". If the host apparatus media information does not include the second application information, the control unit 110 of the host apparatus 100 may determine the second video player application 501 as "incompatible".

The control unit 110 of the host apparatus 100 may determine the application compatibility by determining whether the second video player application 501 is same as the first video player application 500 executed in the host apparatus 100. The second video player application 501 is included in the media information of the accessory switch request message 632 received from the target apparatus 200. For example, if the first video player application 500 and the second video player application 501 are the same, the control unit 110 of the host apparatus 100 may determine the second video player application 501 as "compatible". If the first video player application 500 and the second video player application 501 are different from each other, the control unit 110 of the host apparatus 100 may determine the second video player application 501 as "incompatible".

In the analysis with respect to the compatibility between the first video player application 500 of the host apparatus 100 and the second video player application 501 of the target apparatus 200, the control unit 110 of the host apparatus 100 may determine whether the second video player application 501 of the target apparatus 200 has the compatibility, by using extensions (e.g., avi, mkv, wmv, mp4, etc.) of contents or by using codecs (e.g., mpeg, mpg, divx, xvid, h.264, etc.) supported by the first video player application 500. For example, content that is reproduced in the first video player application 500 of the host apparatus 100 may not be reproduced due to its video codec that is not supported by the compatible second video player application 501 of the target apparatus 200. In this regard, the control unit 110 of the host apparatus 100 may analyze the application compatibility, in consideration of the example case. For example, if at least one of codec of the first video player application 500 of the host apparatus 100 and extension of content is compatible with the second video player application 501 of the target apparatus 200, the control unit 110 of the host apparatus 100 may determine the second video player application 501 as "compatible". If all of codec of the first video player application 500 of the host apparatus 100 and extension of content is not compatible with the second video player application 501 of the target apparatus 200, the control unit 110 of the host apparatus 100 may determine the second video player application 501 as "incompatible".

When the host apparatus 100 analyzes the application compatibility between the first video player application 500 and the second video player application 501 of the target apparatus 200, the control unit 110 of the host apparatus 100 may determine whether the second video player application 501 of the target apparatus 200 has the compatibility, by using a screen size of the host apparatus 100, resolution of content and a screen size of the target apparatus 200, or resolution of content that is supported by the second video player application 501. For example, if the screen size of the host apparatus 100, the resolution of the content and the screen size of the target apparatus 200, or the resolution of the content that is supported by the second video player application 501 are compatible with each other, the control unit 110 of the host apparatus 100 may determine the second video player application 501 as "compatible". If the screen size of the host apparatus 100, the resolution of the content and the screen size of the target apparatus 200, or the resolution of the content that is supported by the second video player application 501 are not compatible with each other, the control unit 110 of the host apparatus 100 may determine the second video player application 501 as "incompatible".

When an application that is a compatibility comparison target object is not a video player application but is another application (e.g., an audio player application (not shown)), the control unit 110 of the host apparatus 100 may determine compatibility of the audio player application by using extensions (e.g., mp3, way, etc.) of content or codecs (e.g., ac3, dts, flac, wma, etc.) supported by the audio player application.

The control unit 110 of the host apparatus 100 may perform a compatibility comparison not only on the video player application and the audio player application, but also may perform a compatibility comparison on other applications.

The control unit 110 of the host apparatus 100 may store compatibility comparison information in the storage unit 180. The stored compatibility comparison information may include a compatibility comparison identifier for a history management, application information related to the compatibility comparison target object, a position of the media information, a comparison time, a compatibility comparison result (e.g., "compatible" and "incompatible"), or the like.

When the host apparatus 100 performs the compatibility comparison, the host apparatus 100 is connected in a wireless manner with each of the target apparatus 200 and the external apparatus 300. Here, the target apparatus 200 is not connected in a wireless manner with the external apparatus 300.

In operation S308 of FIG. 3, the host apparatus 100 determines to switch a wireless connection with the external apparatus 300 (operation S408). In addition, the host apparatus may determine whether to switch the wireless connection based on other parameters such as security information, license information, etc.

In correspondence to the compatibility comparison result (e.g., determined as "compatible"), the control unit 110 of the host apparatus 100 may determine to switch the wireless connection with the external apparatus 300 from the host apparatus 100 to the target apparatus 200. The external apparatus 300 interoperates with the host apparatus 100. By using the stored compatibility comparison information (e.g., determined as "compatible"), the control unit 110 of the host apparatus 100 may determine to switch the wireless connection with the external apparatus 300 from the host apparatus 100 to the target apparatus 200. The external apparatus 300 interoperates with the host apparatus 100. In correspondence to the compatibility comparison result (e.g., determined as "incompatible"), the control unit 110 of the host apparatus 100 may determine to switch the wireless connection with the external apparatus 300 from the host apparatus 100 to the target apparatus 200. The external apparatus 300 then interoperates with the host apparatus 100.

When the control unit 110 of the host apparatus 100 determines "incompatibility" according to the compatibility comparison result, the control unit 110 of the host apparatus 100 may transmit, to the target apparatus 200, substitution information by which the target apparatus 200 can execute (or download) another video player application that substitutes for the second video player application 501.

The control unit 110 of the host apparatus 100 may store, in the storage unit 180, switch determination information with respect to the external apparatus 300. The stored switch determination information with respect to the external apparatus 300 may include a switch determination identifier for a history management with respect to the external apparatus 300, information about the external apparatus 300 that is a switch target, an identifier of the host apparatus 100, an identifier of the target apparatus 200, a switch determination time with respect to the external apparatus 300, the compatibility comparison result (e.g., determined as "compatible" or "incompatible"), or the like.

When the host apparatus 100 determines to switch the wireless connection with the external apparatus 300, the host apparatus 100 is connected in a wireless manner with each of the target apparatus 200 and the external apparatus 300. Here, the target apparatus 200 is not connected in a wireless manner with the external apparatus 300.

In operation S309 of FIG. 3, the host apparatus 100 requests the external apparatus 300 for a host apparatus change, and receives a response thereto from the external apparatus 300 (operation S409).

When the host apparatus 100 determines to switch the wireless connection with the external apparatus 300 from the host apparatus 100 to the target apparatus 200, the control unit 110 of the host apparatus 100 may request the external apparatus 300 that is the switch target for the host apparatus change. For example, the host apparatus 100 may request the external apparatus 300 to change the host apparatus 100, which is a current host apparatus, to the target apparatus 200 that is another host apparatus. The control unit 110 of the host apparatus 100 may transmit not only a request for the host apparatus change but may also transmit apparatus information of the target apparatus 200 (hereinafter, referred to as "target apparatus information") that is stored in the storage unit 180 to the external apparatus 300.

The target apparatus information stored in the host apparatus 100 may include wireless connection information (e.g., an SSID, an IP address, a MAC address, a channel number, a security key, etc.), a product name of the target apparatus 200, an identifier of the target apparatus 200, an MAC address of the target apparatus 200, a type of the target apparatus 200, a profile of the target apparatus 200, a communication method of the target apparatus 200, or the like. The control unit 110 of the host apparatus 100 may transmit not only the request for the host apparatus change but may also transmit a part (e.g., recognizable or settable the target apparatus 200 as a new host apparatus) of the target apparatus information stored in the storage unit 180 to the external apparatus 300.

The control unit 310 of the external apparatus 300 may receive the request for the host apparatus change via the communication unit 330. In correspondence to the request for the host apparatus change, the control unit 310 of the external apparatus 300 may set so that the preset host apparatus 100 can be changed to the new host apparatus that is the target apparatus 200. In response to the request for the host apparatus change, the control unit 310 of the external apparatus 300 may temporarily (or for a short period) store, in the storage unit 380, a change from the preset host apparatus 100 to the new host apparatus 200.

When the target apparatus 200 and the external apparatus 300 are connected in a wireless manner with each other (or via a wireless link set-up), the control unit 310 of the external apparatus 300 may set (or may change) the temporarily-stored new host apparatus as the target apparatus 200. When the target apparatus 200 and the external apparatus 300 attempt to perform wireless connection (or the wireless link set-up), the external apparatus 300 may first search for the target apparatus 200 by using the stored target apparatus information.

The control unit 310 of the external apparatus 300 may transmit a response to the request for the host apparatus change via the communication unit 330. The control unit 310 of the external apparatus 300 may transmit, via the communication unit 330, a response about one of "the host apparatus change is accepted" and "the host apparatus change is not accepted" to the host apparatus 100. The control unit 310 of the external apparatus 300 may transmit, via the communication unit 330, a response about one of "the host apparatus change is completed", "the host apparatus change is to be performed", and "the host apparatus change has an error" to the host apparatus 100.

The control unit 110 of the host apparatus 100 may receive, from the external apparatus 300, the response to the request for the host apparatus change (e.g., "the host apparatus change is accepted", etc.) by using the communication unit 130. The control unit 110 of the host apparatus 100 may store the received response to the request for the host apparatus change in the storage unit 180.

When the host apparatus 100 requests the external apparatus 300 for the host apparatus change, and receives the response thereto from the external apparatus 300, the host apparatus 100 is connected in a wireless manner with each of the target apparatus 200 and the external apparatus 300. Here, the target apparatus 200 is not connected in a wireless manner with the external apparatus 300.

In operation S310 of FIG. 3, a response to an external apparatus switch request is transmitted from the host apparatus 100 to the target apparatus 200 (operation S410).

In correspondence to the compatibility analysis and the response, which is received from the external apparatus 300, to the request for the host apparatus change, the control unit 110 of the host apparatus 100 may transmit, to the target apparatus 200, the response to the external apparatus switch request (e.g., the accessory switch request response message 632b). When the compatibility analysis result by the host apparatus 100 indicates "compatible" and the host apparatus 100 receives the response to the request for the host apparatus change from the external apparatus 300, the control unit 110 of the host apparatus 100 may transmit, to the target apparatus 200, the response to the external apparatus switch request received from the target apparatus 200.

When the compatibility analysis result by the host apparatus 100 indicates "incompatible" or the host apparatus 100 does not receive the response to the request for the host apparatus change from the external apparatus 300, the control unit 110 of the host apparatus 100 may not transmit, to the target apparatus 200, the response to the external apparatus switch request received from the target apparatus 200.

The accessory switch request response message 632b may have a format shown in Table 2.

TABLE 2

| Syntax | Size(bit) | Notes |
| --- | --- | --- |
| Accessory_Response_Format( ) { | — | |
| Management message type=n | 4 | |
| Host_Device_ID | 6 | |
| Accessory_mapping_ID | 8 | 0000: Microphone |
| | | 0001: Headphone |
| | | 0010: Music instrument |
| | | 0011: Speaker |
| | | 0100: Headset |

TABLE 2-continued

| Syntax | Size(bit) | Notes |
| --- | --- | --- |
| ⋮ | ⋮ | ⋮ |
| Target_Device_ID | 6 | |
| Access_authority_info | 2 | 00: Yes |
| | | 11: No |
| Web_source_info | 2 | 00: Yes |
| | | 11: No |
| Reserved | 1 | |
| } | — | |

Here, a management message type field (i.e., Management message type) may indicate "2" corresponding to the accessory switch request response message 632b (e.g., accessory_res). A host apparatus identifier field (i.e., host_device_ID) may indicate an identifier of the host apparatus 100 that interoperates with the external apparatus 300 and receives the external apparatus switch request from the target apparatus 200. An external apparatus mapping identifier field (i.e., accessory_mapping_ID) may indicate an identifier of the external apparatus 300 that interoperates with the host apparatus 100. For example, a microphone field may be "0000", a headphone field may be "0001", a music instrument field may be "0010", a speaker field may be "0011", or a headset field may be "0100". In addition, the number of the external apparatus mapping identifiers may be added, deleted, or changed in one or more exemplary embodiments.

A target apparatus identifier field (i.e., target_device_ID) may indicate an identifier of the target apparatus 200 that requested the host apparatus 100 to switch the wireless connection with the external apparatus 300 from the host apparatus 100 to the target apparatus 200. An access authority information field (i.e., Access_authority_info) may indicate an access authority (e.g., access allowed or access denied) of the target apparatus 200 with respect to the external apparatus 300. The access authority information field may indicate all of the access authority (e.g., access allowed or access denied) of the target apparatus 200 with respect to the external apparatus 300 and an access authority (e.g., access allowed or access denied) of the host apparatus 100 with respect to content.

A web source information field (i.e., Web_source_info) may indicate whether a web server address (or a separate storage device location) is required. For example, when compatibility between the second video player application 501 of the target apparatus 200 and the first video player application 500 is determined, the control unit 110 of the host apparatus 100 may define the web source information field as "00" so as to correspond to a web server address (or a separate storage device location) where the first video player application 500 or another video player application (not shown) that is compatible with the first video player application 500 is stored. If the web source information field is set as "00", the control unit 110 of the host apparatus 100 may add the web server address (the separate storage device location or substitution information, e.g., www.samsung.com/server1) to an additional field (not shown) of the accessory switch request response message 632b.

The accessory switch request response message 632b may be stored in the storage unit 275, according to control by the control unit 110 of the host apparatus 100. The control unit 110 of the host apparatus 100 may receive the accessory switch request response message 632b from an external source (a separate server (not shown)) and may store the accessory switch request response message 632b in the storage unit 275.

In another exemplary embodiment, the control unit 110 of the host apparatus 100 may transmit, to the target apparatus 200, the response to the external apparatus switch request (e.g., the accessory switch request response message 632b and the compatible application message 632c). When the compatibility analysis result indicates "incompatible" and the host apparatus 100 receives the response to the request for the host apparatus change from the external apparatus 300, the control unit 110 of the host apparatus 100 may transmit, to the target apparatus 200, the response to the external apparatus switch request received from the target apparatus 200 and the compatible application message 632c.

When the compatibility analysis result indicates "compatible" and the host apparatus 100 receives the response to the request for the host apparatus change from the external apparatus 300, the control unit 110 of the host apparatus 100 may transmit, to the target apparatus 200, the response to the external apparatus switch request received from the target apparatus 200, and may not transmit the compatible application message 632c to the target apparatus 200.

In correspondence to the compatibility analysis result (e.g., "compatible" or "incompatible"), the control unit 110 of the host apparatus 100 may transmit another accessory switch request response message to the target apparatus 200. For example, a field for the accessory switch request response message 632b may vary according to the compatibility analysis result.

The compatible application message 632c may have a format shown in Table 3.

TABLE 3

| Syntax | Size(bit) | Notes |
| --- | --- | --- |
| Accessory_Response_Format( ) { | — | |
| Management message type=n | 4 | |
| Compatible_info | 8 | 0000: media player 1 |
| | | 0001: video player 1 |
| | | 0010: video player2 |
| | | 0011: video player3 |
| | | 0100: video player4 |
| | | ⋮ |
| Compatible_format | 8 | 0000: avi |
| | | 0001: mkv |
| | | 0010: mp4 |
| | | 0011: asf |
| | | 0100: wma |
| | | ⋮ |
| Web_source_info | 2 | 00: Yes |
| | | 11: No |
| Host_Device_ID | 6 | |
| Target_Device_ID | 6 | |
| Accessory_mapping_ID | 6 | |
| } | — | |

Here, a management message type field (i.e., Management message type) may indicate "3" corresponding to a type of the compatible application message 632c (e.g., compatible_res). A compatible information field (i.e., Compatible info) may indicate an application capable of executing content that is executed in the host apparatus 100. The application capable of executing the content that is executed in the host apparatus 100 may include an application installed in the target apparatus 200 and an application (e.g., a video player3 and a video player4) uninstalled in the target apparatus 200. A compatible formation field (i.e., Compatible_format) may indicate a format of compatible content. A web source information field (i.e., Web_source_info) may indicate whether a web server address (or a separate storage device location) is required.

A host device identifier field (i.e., host_device_ID) may indicate an identifier of the host apparatus 100 that is initially interoperates with the external apparatus 300 and receives the external apparatus switch request from the target apparatus 200.

A target apparatus identifier field (i.e., target_device_ID) may indicate an identifier of the target apparatus 200 that requested the host apparatus 100 to switch the wireless connection with the external apparatus 300 from the host apparatus 100 to the target apparatus 200. An external apparatus mapping identifier field (i.e., appessory_mapping_ID) may indicate an identifier of the external apparatus 300 that interoperates with the host apparatus 100.

The compatible application message 632c may be stored in the storage unit 275, according to control by the control unit 110 of the host apparatus 100. The control unit 110 of the host apparatus 100 may receive the compatible application message 632c from an external source (a separate server (not shown)) and may store the compatible application message 632c in the storage unit 275.

When the host apparatus 100 transmits the response to the external apparatus switch request to the external apparatus 300, the host apparatus 100 is connected in a wireless manner with each of the target apparatus 200 and the external apparatus 300. The target apparatus 200 is not connected in a wireless manner with the external apparatus 300.

In operation S311 of FIG. 3, the target apparatus 200 determines an access authority (operation S411).

The control unit 210 of the target apparatus 200 may receive, from the host apparatus 100, the response to the external apparatus switch request (e.g., the accessory switch request response message 632b) by using the mobile communication unit 220 and/or the sub-communication unit 230.

The control unit 210 of the target apparatus 200 may determine the second video player application 501 as compatible, in correspondence to reception of the accessory switch request response message 632b. The compatible second video player application 501 may execute, by control of the control unit 210, content that is reproduced in the first video player application 500. The control unit 210 of the target apparatus 200 may determine whether to reproduce, via the second video player application 501, the content that is reproduced in the first video player application 500, by using the compatible information field of the compatible application message 632c.

The control unit 210 of the target apparatus 200 may determine an access authority with respect to the external apparatus 300, by using the access authority information field of the accessory switch request response message 632b.

The control unit 210 of the target apparatus 200 may store the accessory switch request response message 632b in the storage unit 275. The control unit 210 of the target apparatus 200 may receive the accessory switch request response message 632b from an external source (e.g., a separate server (not shown) and may store the accessory switch request response message 632b in the storage unit 275.

The control unit 210 of the target apparatus 200 may receive the response to the external apparatus switch request (e.g., the accessory switch request response message 632b and the compatible application message 632c) by using the mobile communication unit 220 and/or the sub-communication unit 230. The control unit 210 of the target apparatus 200 may determine an access authority with respect to the external apparatus 300 and a content access authority with respect to the host apparatus 100, by using the access authority information field of the accessory switch request response message 632b.

The control unit 210 of the target apparatus 200 may store the accessory switch request response message 632b and the compatible application message 632c in the storage unit 275. The control unit 210 of the target apparatus 200 may receive the accessory switch request response message 632b and the compatible application message 632c from an external source (e.g., a separate server (not shown) and may store the accessory switch request response message 632b and the compatible application message 632c in the storage unit 275.

When the target apparatus 200 determines the access authority, the host apparatus 100 is connected in a wireless manner with each of the target apparatus 200 and the external apparatus 300. The target apparatus 200 is not connected in a wireless manner with the external apparatus 300.

In operation S312 of FIG. 3, the target apparatus 200 and the external apparatus 300 are connected with each other (operation S412).

Referring to FIG. 5D, the control unit 210 of the target apparatus 200 may search for the external apparatus 300 by using the accessory switch request response message 632b received via the mobile communication unit 220 and/or the sub-communication unit 230. The control unit 210 of the target apparatus 200 may search for the adjacent external apparatus 300 by using an external apparatus mapping identifier. The control unit 210 of the target apparatus 200 may search for the external apparatus 300 by using pre-stored external apparatus information. The control unit 210 of the target apparatus 200 may be connected to the external apparatus 300 by using the external apparatus mapping identifier and the external apparatus information. The external apparatus 300 that is a connection target may be selected, by a user, from a search list (not shown) corresponding to a search result displayed on a screen of the target apparatus 200, and may be connected with the target apparatus 200.

When the target apparatus 200 and the external apparatus 300 are connected with each other, the control unit 210 of the target apparatus 200 may transmit a notice about completion of the connection between the target apparatus 200 and the external apparatus 300 to the host apparatus 100.

In operation S312 of FIG. 3, the connection between the target apparatus 200 and the external apparatus 300 is substantially similar (e.g., the target apparatus 200 is a changed host apparatus, and the connection is performed by using the stored external apparatus information) to the connection between the host apparatus 100 and the external apparatus 300 in operation S301 of FIG. 3, thus, redundant descriptions thereof are omitted here.

When the target apparatus 200 and the external apparatus 300 are connected, the host apparatus 100 is connected in a wireless manner with the target apparatus 200. The target apparatus 200 is connected in a wireless manner with each of the host apparatus 100 and the external apparatus 300.

In operation S313 of FIG. 3, content is transmitted from the host apparatus 100 to the target apparatus 200 (operation S413).

The control unit 110 of the host apparatus 100 may transmit the content, which is reproduced in the first video player application 500, to the target apparatus 200 via the communication unit 130.

After the host apparatus 100 is connected with the target apparatus 200 or after the target apparatus 200 and the external apparatus 300 are connected, the control unit 110 of the host apparatus 100 may transmit the content to the target apparatus 200. When the host apparatus 100 is connected with the target apparatus 200, the control unit 110 of the host apparatus 100 may transmit at any time the content to the target apparatus 200. When the host apparatus 100 is connected with the target apparatus 200, the control unit 110 of the host apparatus 100 may transmit at any time the content to the target apparatus 200, in response to a content transmission request (not shown) from the target apparatus 200.

The control unit 110 of the host apparatus 100 may transmit not only the content but also first application information (e.g., a first video player application) stored in the storage unit 180 to the target apparatus 200. The control unit 110 of the host apparatus 100 may transmit not only the content but also a part of the first application information (e.g., a first video player application) stored in the storage unit 180 to the target apparatus 200. The transmitted part of the first application information may include application execution state information (e.g., a reproduction position of content, a current level of content (e.g., a game), etc.) that corresponds to a transmission time of the first application information.

When the content is transmitted from the host apparatus 100 to the target apparatus 200, the host apparatus 100 and the target apparatus 200 are connected in a wireless manner with each other. The target apparatus 200 is connected in a wireless manner with each of the host apparatus 100 and the external apparatus 300.

In operation S314 of FIG. 3, the content is output from the target apparatus 200 to the external apparatus 300 (operation S414).

Referring to FIG. 5D, when the content is received from the host apparatus 100, the control unit 210 of the target apparatus 200 may reproduce the content in the second video player application 501. The control unit 210 of the target apparatus 200 may seamlessly reproduce the content in the second video player application 501 by using the first application information. The control unit 210 of the target apparatus 200 may store the content and the first application information in the storage unit 275.

The control unit 210 of the target apparatus 200 may provide a user with a feedback corresponding to the content execution (e.g., an output of the content from the target apparatus 200 to the external apparatus 300) in the second video player application 501. The feedback provided by the target apparatus 200 is one of a visual feedback, an acoustic feedback, and a tactile feedback. The control unit 210 of the target apparatus 200 may provide the user with one of the visual feedback, the acoustic feedback, and the tactile feedback or a combination of the visual feedback, the acoustic feedback, and the tactile feedback.

The visual feedback may be displayed as a visual effect (e.g., a separate image or an animation effect such as a fade applied to the separate image) corresponding to the content execution (e.g., the output of the content from the target apparatus 200 to the external apparatus 300) in the second video player application 501. The visual effect differs from the content displayed in the second video player application 501. The acoustic feedback may be output, via the speaker 263, as a sound corresponding to the content execution (e.g., the output of the content from the target apparatus 200 to the external apparatus 300) in the second video player application 501. The tactile feedback may be output, via the vibration motor 264, as a vibration corresponding to the content execution (e.g., the output of the content from the target apparatus 200 to the external apparatus 300) in the second video player application 501.

In a configuration setting (not shown) of the target apparatus 200, the user may select and/or may change the feedback (e.g., at least one of the visual feedback, the acoustic feedback, and the tactile feedback) corresponding to the content execution (e.g., the output of the content from the target apparatus 200 to the external apparatus 300) in the second video player application 501.

The user may input and/or may change a feedback provision time (e.g., 700 msec, changeable) during which at least one feedback is provided to the user.

The control unit 210 of the target apparatus 200 may output, to the external apparatus 300, the content that is reproduced in the second video player application 501. The control unit 310 of the external apparatus 300 may output the content via at least one of the display unit 370 and the speaker 375. For example, when the content is video, the control unit 310 of the external apparatus 300 may output the content via the display unit 370 and the speaker 375. When the content is audio, the control unit 310 of the external apparatus 300 may output the content via the speaker 375.

The control unit 310 of the external apparatus 300 may provide the user with a feedback corresponding to the output of the content. The control unit 310 of the external apparatus 300 may provide the user with the feedback by using one or more elements (e.g., the display unit 370 that corresponds to a visual feedback, the speaker 375 that corresponds to an acoustic feedback, and/or (a vibration motor (not shown) that corresponds to a tactile feedback) of the external apparatus 300.

The feedback provided by the external apparatus 300 is substantially similar to the feedback provided by the target apparatus 200, thus, redundant descriptions thereof are omitted here.

When the target apparatus 200 outputs the content to the external apparatus 300, the host apparatus 100 and the target apparatus 200 are connected in a wireless manner with each other. The target apparatus 200 is connected in a wireless manner with each of the host apparatus 100 and the external apparatus 300.

When the content of the target apparatus 200 is output to the external apparatus 300, the method of outputting content, the method performed by the host apparatus 100, the target apparatus 200, and the external apparatus 300, is ended.

Figure 7:
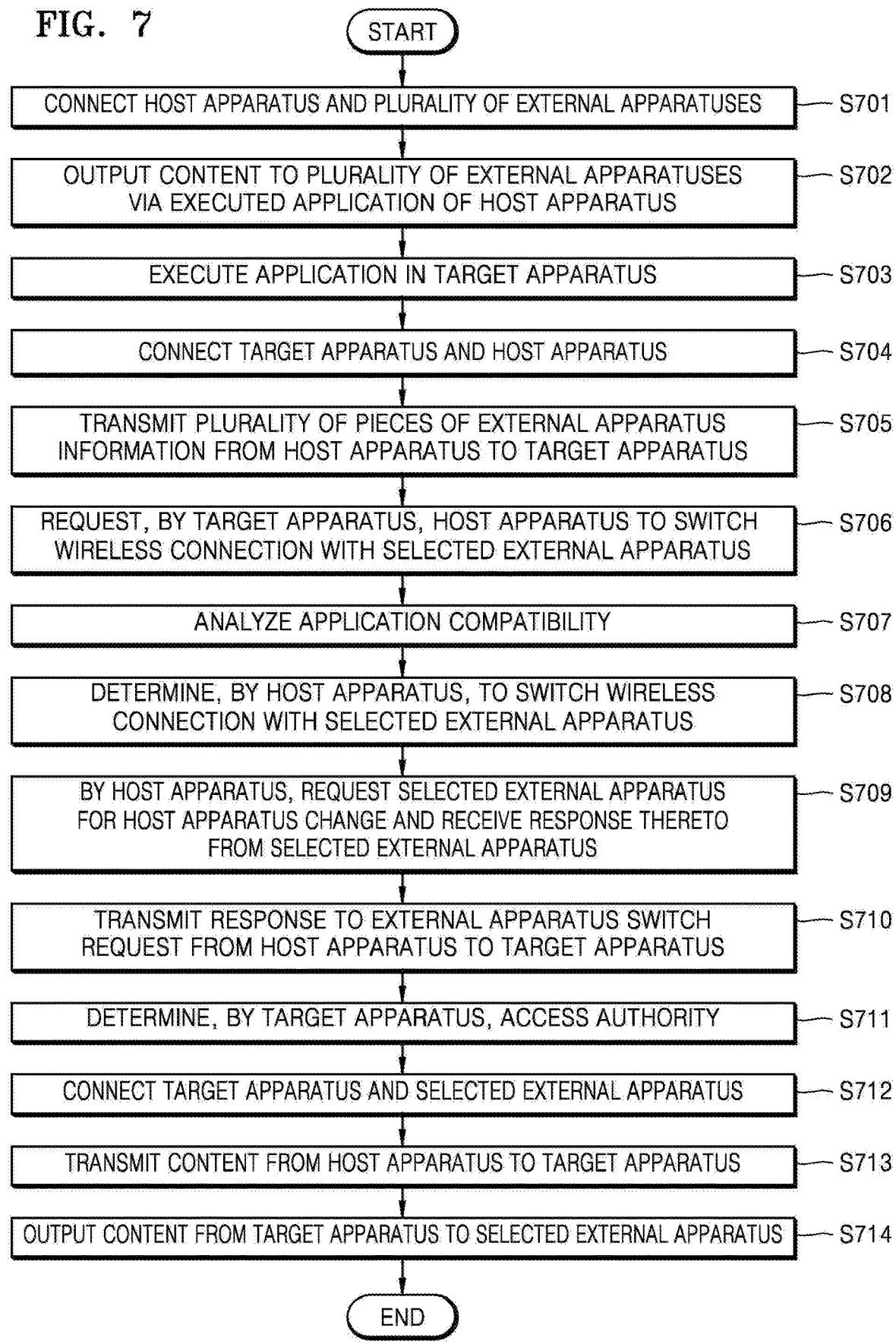
FIG. 7 illustrates a flowchart illustrating a method of outputting content, the method performed by the host apparatus, the target apparatus, and a plurality of external apparatuses, according to another exemplary embodiment.

FIG. 7 illustrates a flowchart illustrating a method of outputting content, the method performed by the host apparatus 100, the target apparatus 200, and a plurality of external apparatuses, according to another exemplary embodiment.

Figure 8:
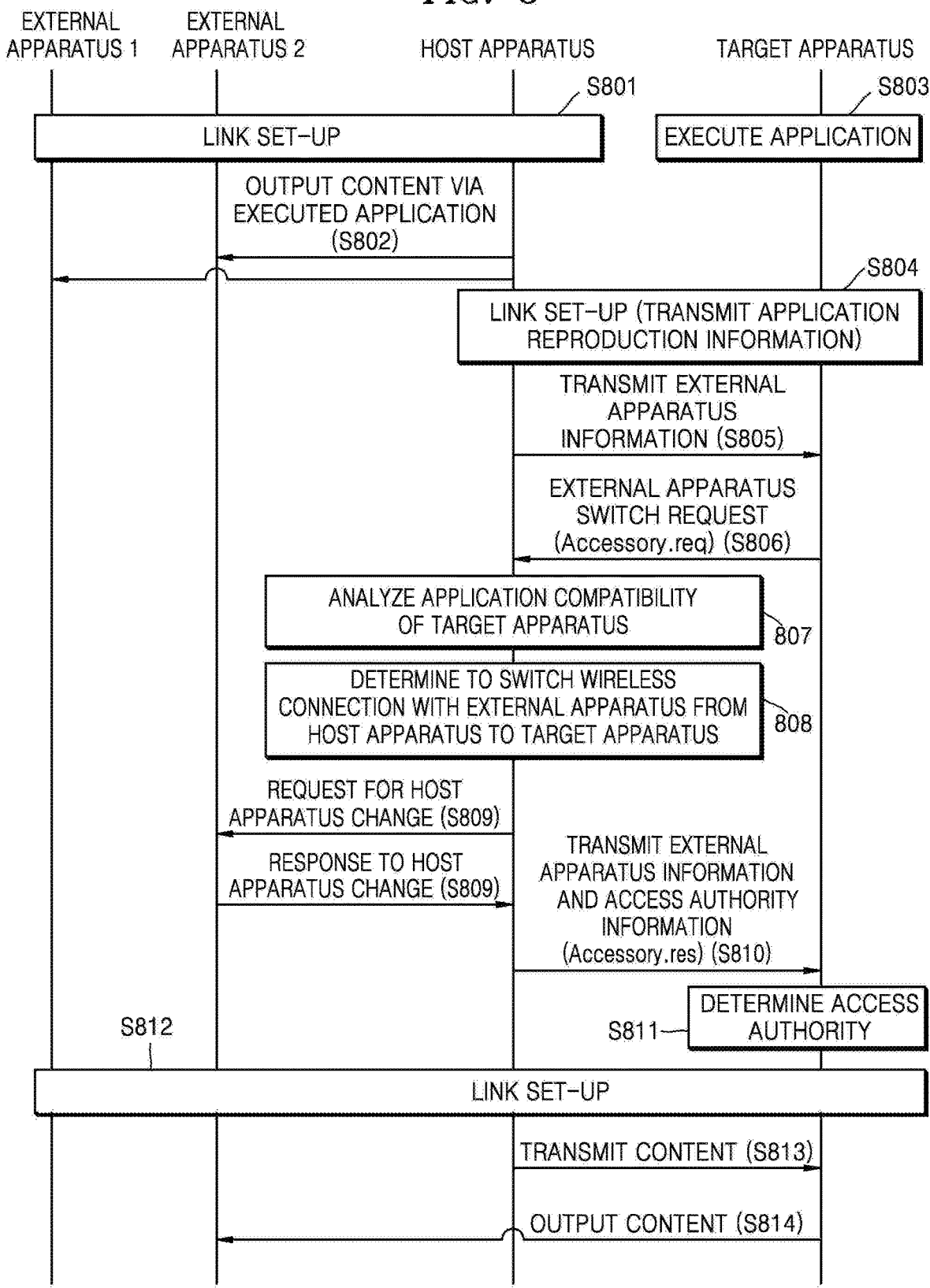
FIG. 8 illustrates a sequence diagram illustrating the method of outputting content, the method performed by the host apparatus, the target apparatus, and the plurality of external apparatuses, according to an exemplary embodiment.

FIG. 8 illustrates a sequence diagram illustrating the method of outputting content, the method performed by the host apparatus 100, the target apparatus 200, and the plurality of external apparatuses, according to the exemplary embodiment.

FIGS. 9A through 9D illustrate the method of outputting content, the method performed by the host apparatus 100, the target apparatus 200, and the plurality of external apparatuses, according to the exemplary embodiment.

In operation S701 of FIG. 7, the host apparatus 100 and the plurality of external apparatuses are connected to each other (operation S801).

The control unit 110 of the host apparatus 100 (e.g., a display apparatus) may search for adjacent electronic apparatuses by using the communication unit 130. The plurality of external apparatuses (e.g., the external apparatus 300

(also referred to as the external apparatus1 300) and an external apparatus2 301) may be selected by a user (e.g., a user's touch, etc.) from a search list (not shown) corresponding to a search result displayed on a screen of the host apparatus 100. The external apparatus1 300 and the external apparatus2 301 may be same apparatuses (e.g., a headphone1 and a headphone) or different apparatuses (e.g., the headphone1 and a sound bar). However, the types of the external apparatuses are not limited thereto. The external apparatus1 300 and the external apparatus2 301 may have substantially similar elements 310 through 390. The control unit 310 of the external apparatus1 300 may be different from a control unit 310a (not shown) of the external apparatus2 301. The difference may also be applied to other elements. When the external apparatus1 300 is a headphone, the external apparatus1 300 may include only the speaker 375, without the display unit 370. When the external apparatus2 301 is a sound bar, the external apparatus2 301 may include the display unit 370 and the speaker 375.

The control unit 110 of the host apparatus 100 may be connected in a wireless manner with the communication unit 330 of the external apparatus1 300 and a communication unit 330a (not shown) of the external apparatus2 301 by using the communication unit 130. According to the user, the control unit 110 of the host apparatus 100 may select at least one of various profiles (e.g., A2DP, HFP, etc.) that are supported by the plurality of external apparatuses 300 and 301. The control units 310 and 310a of the plurality of external apparatuses 300 and 301 may be connected in a wireless manner with the communication unit 130 of the host apparatus 100 by using the communication units 330 and 330a, respectively.

The control unit 110 of the host apparatus 100 may store apparatus information of each of the plurality of external apparatuses 300 and 301 (hereinafter, referred to as "a plurality of pieces of external apparatus information" or "each external apparatus information") in the storage unit 180. The each stored external apparatus information may include wireless connection information (e.g., SSID, an IP address, an MAC address, a channel number, a security key, etc.), the number of the plurality of external apparatuses 300 and 301, a product name of each of the plurality of external apparatuses 300 and 301, an identifier of each of the plurality of external apparatuses 300 and 301, an MAC address of each of the plurality of external apparatuses 300 and 301, a type of each of the plurality of external apparatuses 300 and 301, a profile of each of the plurality of external apparatuses 300 and 301, a communication method of each of the plurality of external apparatuses 300 and 301, or the like.

The control units 310 and 310a of the plurality of external apparatuses 300 and 301 may store information defining a wirelessly-connected display apparatus as the host apparatus 100 in the storage unit 380 and a storage unit 380a (not shown), respectively. The control units 310 and 310a of the plurality of external apparatuses 300 and 301 may store apparatus information of the host apparatus 100 (hereinafter, referred to as "host apparatus information") in their storage units 380 and 380a, respectively. The stored host apparatus information may include wireless connection information (e.g., an SSID, an IP address, a MAC address, a channel number, a security key, etc.), a product name of the host apparatus 100, an identifier of the host apparatus 100, an MAC address of the host apparatus 100, a type of the host apparatus 100, a profile of the selected host apparatus 100, a communication method of the host apparatus 100, or the like.

In operation S702 of FIG. 7, the host apparatus 100 outputs content, which is executed in an application, to the plurality of external apparatuses 300 and 301 (operation S802).

The control unit 110 of the host apparatus 100 may output the content reproduced in the application to the plurality of external apparatuses 300 and 301 that are connected to the host apparatus 100. According to the user or a preset condition (e.g., to display a news channel at 10 a.m., etc.), the control unit 110 of the host apparatus 100 may execute the application. In the executed application, the content is reproduced (e.g., the content is displayed on a screen, is transmitted via a communication unit, or is output via a speaker). Various contents may be reproduced in applications according to types of the applications.

The control units 310 and 310a of the plurality of external apparatuses 300 and 301 may output the content received via the communication units 330 and 330a, respectively. For example, when the received content is a video, the control units 310 and 310a of the plurality of external apparatuses 300 and 301 may output the content by using the display units 370 and 370a and the speakers 375 and 375a, respectively. When the received content is an audio, the control units 310 and 310a of the plurality of external apparatuses 300 and 301 may output the content via the speakers 375 and 375a, respectively.

Figure 9A:
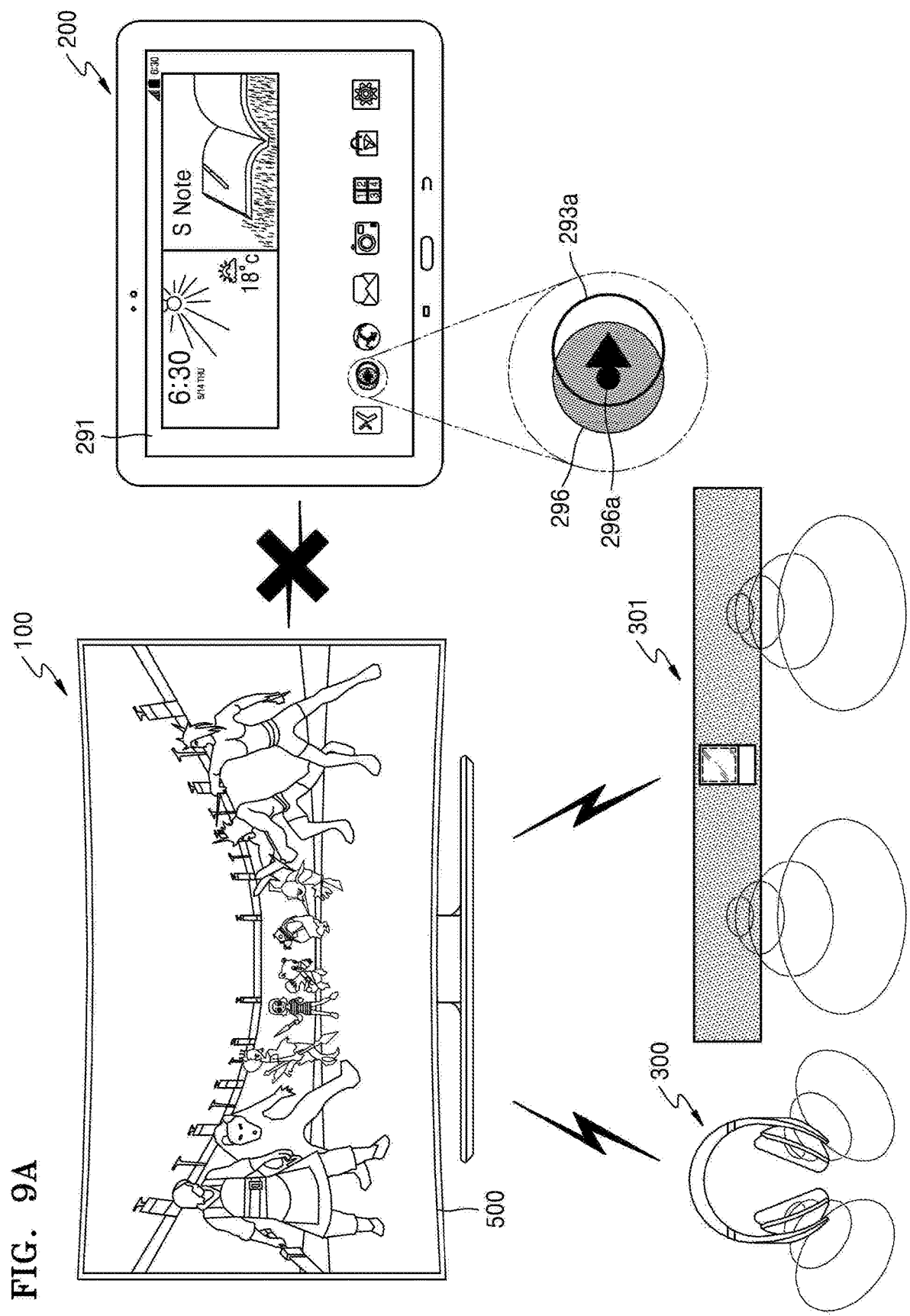
FIGS. 9A through 9D illustrate the method of outputting content, the method performed by the host apparatus, the target apparatus, and the plurality of external apparatuses, according to an exemplary embodiment.

Referring to FIG. 9A, the control unit 110 of the host apparatus 100 may transmit audio data to each of the plurality of external apparatuses 300 and 301. The audio data is included in a video file reproduced in the first video player application 500. The control units 310 and 310a of the plurality of external apparatuses 300 and 301 may output the audio data via the speakers 375 and 375a, respectively. The control unit 110 of the host apparatus 100 may output the video file reproduced in the first video player application 500 via a touch screen and/or a speaker of the host apparatus 100.

Here, the host apparatus 100 and the target apparatus 200 are not connected in a wireless manner. In addition, the host apparatus 100 and the plurality of external apparatuses 300 and 301 are connected in a wireless manner with each other.

In operation S702 of FIG. 7, the connection between the host apparatus 100 and the plurality of external apparatuses 300 and 301 is substantially similar to the connection between the host apparatus 100 and the external apparatus 300 in operations S302 of FIG. 3, thus, redundant descriptions thereof are omitted here.

In operation S703 of FIG. 7, an application is executed in the target apparatus 200 (operation S803).

Referring to FIG. 9A, a user performs a first touch 296 on the shortcut icon 293a on a screen of the target apparatus 200 (e.g., a tablet apparatus). The shortcut icon 293a corresponds to a second video player application. The control unit 210 may detect the first touch 296 by using the touchscreen 290 and the touchscreen controller 295. The control unit 210 may calculate a first touch position 296a (e.g., X1 and Y1 coordinates) corresponding to the first touch 296, by using an electrical signal received from the touchscreen controller 295.

Figure 9B:
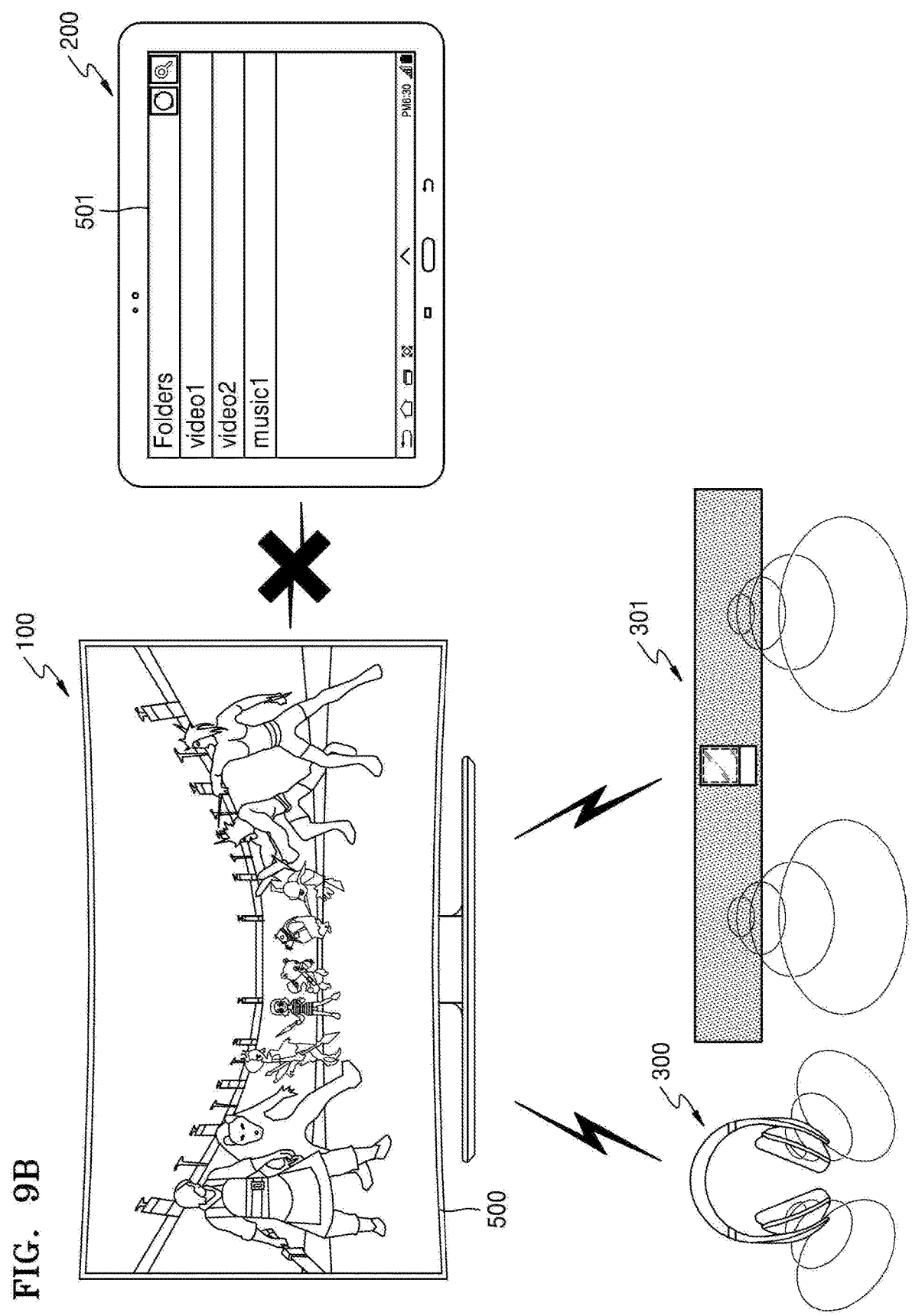

Referring to FIG. 9B, the control unit 210 of the target apparatus 200 may execute a second video player application 501, according to the first touch 296. Folder (e.g., a video1 folder, a video2 folder, and a music1 folder) storing various contents (e.g., video files) that are executable in the executed second video player application 501 are displayed. When the user selects content to be reproduced from one folder, the control unit 210 of the target apparatus 200 may display the content on a window of the second video player application 501, and may output an audio of the content via the speaker 275.

In some exemplary embodiments, the second video player application 501 may not reproduce the content or may reproduce the content.

When the second video player application 501 is executed in the target apparatus 200, the target apparatus 200 and the host apparatus 100 are not connected in a wireless manner with each other. The host apparatus 100 and the external apparatus 300 are connected in a wireless manner with each other.

In operation S703 of FIG. 7, the connection between the host apparatus 100 and the plurality of external apparatuses 300 and 301 is substantially similar to the connection between the host apparatus 100 and the external apparatus 300 in operations S301 of FIG. 3, thus, redundant descriptions thereof are omitted here.

In operation S704 of FIG. 7, the host apparatus 100 and the target apparatus 200 are connected (operation S804).

Figure 9C:
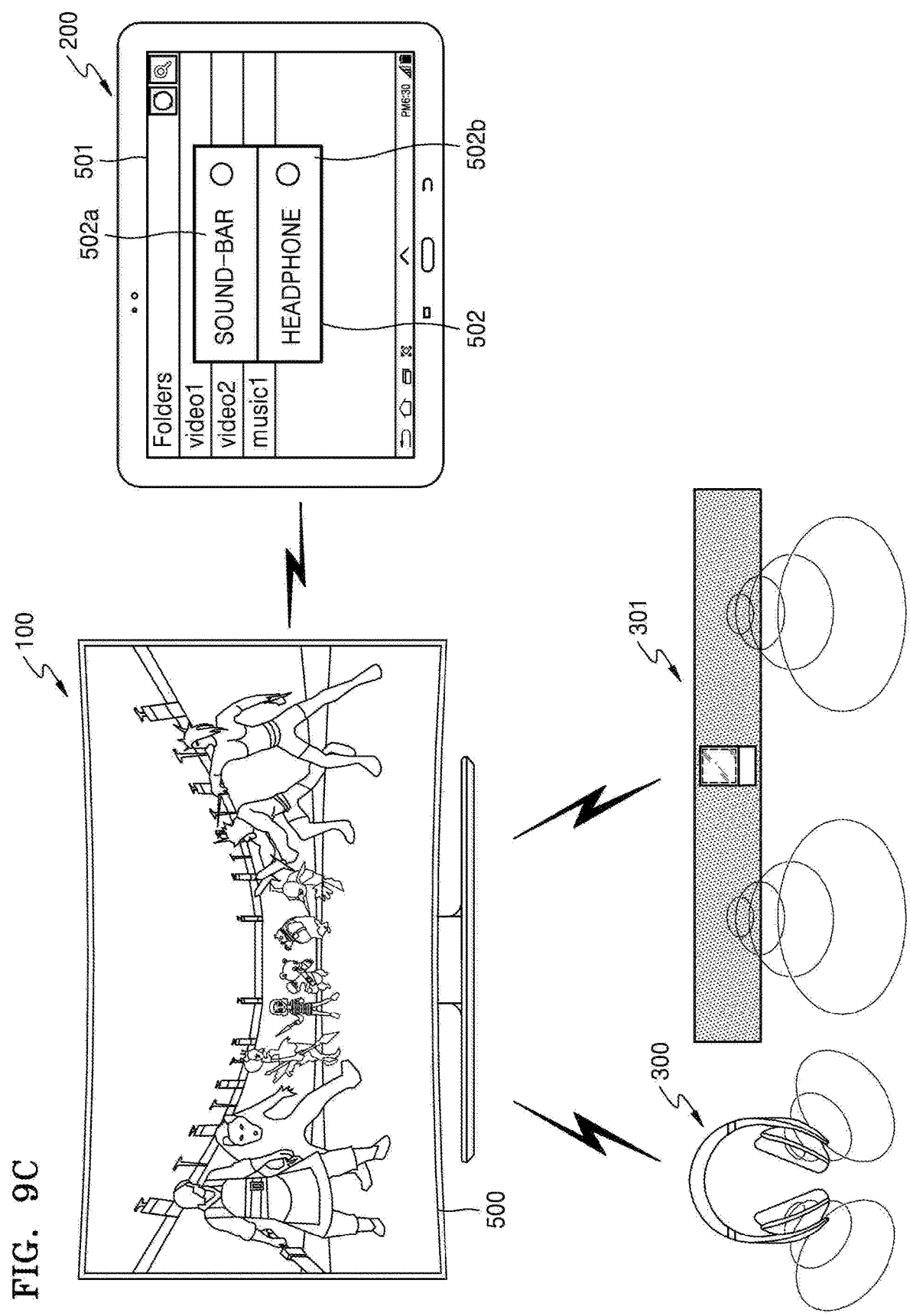

Referring to FIG. 9C, when the second video player application 501 is executed in the target apparatus 200, the control unit 210 of the target apparatus 200 may search for an adjacent host apparatus by using the mobile communication unit 220 and/or the sub-communication unit 230. The host apparatus 100 that is a connection target may be selected by a user from a search list (not shown) corresponding to a search result displayed on a screen of the target apparatus 200.

The control unit 210 of the target apparatus 200 may store the apparatus information of the host apparatus 100 in the storage unit 275, according to the connection with the host apparatus 100.

When the target apparatus 200 and the host apparatus 100 are connected, the control unit 210 of the target apparatus 200 may transmit, to the host apparatus 100, second application information corresponding to the executed second video player application 501 by using the mobile communication unit 220 and/or the sub-communication unit 230.

In operation S704 of FIG. 7, the connection between the host apparatus 100 and the target apparatus 200 is substantially similar to the connection between the host apparatus 100 and the target apparatus 200 in operations S304 of FIG. 3, thus, redundant descriptions thereof are omitted here.

In operation S705 of FIG. 7, the plurality of pieces of external apparatus information are transmitted from the host apparatus 100 to the target apparatus 200 (operation S805).

When the target apparatus 200 and the host apparatus 100 are connected, the control unit 110 of the host apparatus 100 may transmit, to the target apparatus 200 and by using the communication unit 130, the plurality of pieces of external apparatus information corresponding to the plurality of external apparatuses 300 and 301, respectively.

The control unit 110 of the host apparatus 100 may transmit all of the plurality of pieces of external apparatus information stored in the storage unit 180 to the target apparatus 200 or may selectively transmit a part of each of the plurality of pieces of external apparatus information stored in the storage unit 180 to the target apparatus 200.

In operation S705 of FIG. 7, the transmission of the plurality of pieces of external apparatus information from the host apparatus 100 to the target apparatus 200 is substantially similar to the transmission of the external apparatus information from the host apparatus 100 to the target apparatus 200 in operations S305 of FIG. 3, thus, redundant descriptions thereof are omitted here.

In operation S706 of FIG. 7, the target apparatus 200 requests the host apparatus 100 to switch a wireless connection with a selected external apparatus (operation S806).

When the target apparatus 200 receives the plurality of pieces of external apparatus information from the host apparatus 100, the control unit 210 of the target apparatus 200 may request (by using accessory_req) the host apparatus 100 to switch a wireless connection with at least one external apparatus of the plurality of external apparatuses 300 and 301 that interoperate with the host apparatus 100.

When external apparatus information is transmitted from the host apparatus 100, in correspondence to transmission of the application information from the target apparatus 200 to the host apparatus 100, the control unit 210 of the target apparatus 200 may request (by using accessory_req) the host apparatus 100 to switch a wireless connection with at least one external apparatus of the plurality of external apparatuses 300 and 301 that interoperate with the host apparatus 100.

Referring to FIG. 9C, when the target apparatus 200 receives the plurality of pieces of external apparatus information from the host apparatus 100, the control unit 210 of the target apparatus 200 may display, on a screen of the target apparatus 200 and by using the plurality of pieces of external apparatus information, a pop-up window 502 including information about external apparatuses with respect to which wireless connection is to be switched. The pop-up window 502 may include external apparatus names (e.g., a sound bar 502a, a headphone 502b) of the external apparatuses with respect to which wireless connection is to be switched. A user may select at least one from the displayed external apparatus names. When the user selects one (e.g., the headphone 502b) of the external apparatus names, the control unit 210 of the target apparatus 200 may store the selected external apparatus name (e.g., the headphone 502b) in the storage unit 275. The control unit 210 of the target apparatus 200 may add, to the accessory switch request message 632a, an external apparatus mapping identifier corresponding to the selected external apparatus name (e.g., the headphone 502b). The control unit 210 of the target apparatus 200 may transmit, to the host apparatus 100, the accessory switch request message 632a to which the external apparatus mapping identifier has been added.

The accessory switch request message 632a to which the external apparatus mapping identifier has been added may have a format shown in Table 1-1.

TABLE 1-1

| Syntax | Size(bit) | Notes |
| --- | --- | --- |
| Accessory_Request_Format( ) { | — | |
| Management message type=n | 4 | |
| Target_Device_ID | 6 | |
| Media info | 8 | 0000: media player1 |
| | | 0001: video player1 |
| | | 0010: video player2 |
| | | 0011: media player2 |
| | | 0100: audio player1 |
| | | . |
| | | . |
| Accessory_mapping_ID | 4 | |
| Reserved | 1 | |
| } | — | |

Here, a management message type field (i.e., Management message type) may indicate "1" corresponding to the accessory switch request message 632a (e.g., accessory_req). A target apparatus identifier field (i.e., Target_Device_ID) may indicate an identifier for identifying the target apparatus 200 from among various electronic apparatuses.

A media information field (i.e., Media info) may indicate an application that is executed in the target apparatus 200. For example, when the second video player application 501 is executed in the target apparatus 200, the media information field may indicate "0010". The media information field may indicate an application that is installed in the target apparatus 200. For example, if a first media player application, a first video player application, a second video player application, a second media player application, and a first audio player application were installed in the target apparatus 200, the media information field may indicate "0000", "0001", "0010", "0011", and "0100". The media information field may indicate an application capable of executing content (e.g., a video) in the target apparatus 200. For example, when an application of the target apparatus 200 that supports a video is the first media player application, the first video player application, the second video player application, the second media player application, and the first audio player application, the media information field may indicate "0000", "0001", "0010", "0011", and "0100".

The external apparatus mapping identifier may indicate an external apparatus that is selected by the user. For example, when the selected external apparatus is a headphone, the external apparatus mapping identifier may indicate "0001".

When the host apparatus 100 and the target apparatus 200 are connected, the host apparatus 100 is connected in a wireless manner with each of the target apparatus 200 and the plurality of external apparatuses 300 and 301. The target apparatus 200 is not connected in a wireless manner with the selected external apparatus 300.

In operation S706 of FIG. 7, the external apparatus switch request from the target apparatus 200 to the host apparatus 100 is substantially similar to the external apparatus switch request from the target apparatus 200 to the host apparatus 100 in operation S306 of FIG. 3, thus, redundant descriptions thereof are omitted here.

In operation S707 of FIG. 7, application compatibility is analyzed (operation S807).

The control unit 110 of the host apparatus 100 analyzes the application compatibility by using the accessory switch request message. The control unit 110 of the host apparatus 100 may compare compatibility between the first video player application 500 executed in the host apparatus 100 and the second video player application 501 set in the media information of the accessory switch request message. The compatibility may indicate whether content that is executed in the first video player application 500 is executable in the second video player application 501 of the target apparatus 200.

When the host apparatus 100 performs the compatibility comparison, the host apparatus 100 is connected in a wireless manner with each of the target apparatus 200 and the plurality of external apparatuses 300 and 301. The target apparatus 200 is not connected in a wireless manner with the selected external apparatus 300.

In operation S707 of FIG. 7, the compatibility analysis performed by the host apparatus 100 is substantially similar to the compatibility analysis performed by the host apparatus 100 in operation S307 of FIG. 3, thus, redundant descriptions thereof are omitted here.

In operation S708 of FIG. 7, the host apparatus 100 determines to switch a wireless connection with the external apparatus 300 (operation S808).

In correspondence to the compatibility comparison result (e.g., determined as "compatible"), the control unit 110 of the host apparatus 100 may determine to switch the wireless connection with the external apparatus 300 from the host apparatus 100 to the target apparatus 200. The external apparatus 300 is from among the plurality of external apparatuses 300 and 301 that interoperate with the host apparatus 100. By using the stored compatibility comparison information (e.g., determined as "compatible"), the control unit 110 of the host apparatus 100 may determine to switch the wireless connection with the external apparatus 300 from the host apparatus 100 to the target apparatus 200. The external apparatus 300 is from among the plurality of external apparatuses 300 and 301 that interoperate with the host apparatus 100. In correspondence to the compatibility comparison result (e.g., determined as "incompatible"), the control unit 110 of the host apparatus 100 may determine to switch the wireless connection with the external apparatus 300 from the host apparatus 100 to the target apparatus 200. The external apparatus 300 is from among the plurality of external apparatuses 300 and 301 that interoperate with the host apparatus 100.

When the host apparatus 100 determines to switch the wireless connection with the external apparatus 300, from among the plurality of external apparatuses 300 and 301, from the host apparatus 100 to the target apparatus 200, the host apparatus 100 is connected in a wireless manner with each of the target apparatus 200 and the plurality of external apparatuses 300 and 301. The target apparatus 200 is not connected in a wireless manner with the selected external apparatus 300.

In operation S708 of FIG. 7, the determination, by the host apparatus 100, related to switching the wireless connection with the selected external apparatus 300 is substantially similar to the determination, by the host apparatus 100, related to switching the wireless connection with the selected external apparatus 300 in operation S308 of FIG. 3, thus, redundant descriptions thereof are omitted here.

In operation S709 of FIG. 7, the host apparatus 100 requests the selected external apparatus 300 for a host apparatus change, and receives a response thereto from the selected external apparatus 300 (operation S809).

When the host apparatus 100 determines to switch the wireless connection with the external apparatus 300 from the host apparatus 100 to the target apparatus 200, the control unit 110 of the host apparatus 100 may request the external apparatus 300 that is the switch target for the host apparatus change. For example, the host apparatus 100 may request the external apparatus 300 to change the host apparatus 100, which is a current host apparatus, to the target apparatus 200 that is another host apparatus. The control unit 110 of the host apparatus 100 may transmit not only a request for the host apparatus change but may also transmit apparatus information of the target apparatus 200 (hereinafter, referred to as "target apparatus information") that is stored in the storage unit 180 to the external apparatus 300.

The control unit 310 of the external apparatus 300 may receive the request for the host apparatus change via the communication unit 330. In correspondence to the request for the host apparatus change, the control unit 310 of the external apparatus 300 may set so that the preset host apparatus 100 can be changed to the new host apparatus that is the target apparatus 200. In response to the request for the host apparatus change, the control unit 310 of the external apparatus 300 may temporarily (or for a short period) store, in the storage unit 380, a change from the preset host apparatus 100 to the new host apparatus 200.

The control unit 110 of the host apparatus 100 may receive, from the external apparatus 300, the response to the request for the host apparatus change (e.g., "the host apparatus change is accepted", etc.) by using the communication unit 130. The control unit 110 of the host apparatus 100 may store the received response to the request for the host apparatus change in the storage unit 180.

In operation S709 of FIG. 7, the request for the host apparatus change from the host apparatus 100 to the selected external apparatus 300 and the response to the request are substantially similar to the request for the host apparatus change from the host apparatus 100 to the selected external apparatus 300 and the response to the request in operation S309 of FIG. 3, thus, redundant descriptions thereof are omitted here.

In operation S710 of FIG. 7, a response to an external apparatus switch request is transmitted from the host apparatus 100 to the target apparatus 200 (operation S810).

In correspondence to the compatibility analysis and the response, which is received from the external apparatus 300, to the request for the host apparatus change, the control unit 110 of the host apparatus 100 may transmit, to the target apparatus 200, the response to the external apparatus switch request (e.g., the accessory switch request response message 632b).

The accessory switch request response message 632b may have a format shown in Table 2-1.

TABLE 2-1

| Syntax | Size(bit) | Notes |
|---|---|---|
| Accessory_Response_Format( ) { | — | |
| Management message type=n | 4 | |
| Host_Device_ID | 6 | |
| Accessory_mapping_ID | 4 | |
| Target_Device_ID | 6 | |
| Access_authority_info | 2 | 00: Yes |
| | | 11: No |
| Web_source_info | 2 | 00: Yes |
| | | 11: No |
| Reserved | 1 | |
| } | — | |

Here, a management message type field (i.e., Management message type) may indicate "2" corresponding to the accessory switch request response message 632b (e.g., accessory_res). A host apparatus identifier field (i.e., host_device_ID) may indicate an identifier of the host apparatus 100 that interoperates with the external apparatus 300 and receives the external apparatus switch request from the target apparatus 200. An external apparatus mapping identifier field (i.e., accessory_mapping_ID) may indicate an identifier of the external apparatus 300 that interoperates with the host apparatus 100. For example, a headphone field may be "0001".

In another exemplary embodiment, the control unit 110 of the host apparatus 100 may transmit, to the target apparatus 200, the response to the external apparatus switch request (e.g., the accessory switch request response message 632b and the compatible application message 632c).

In operation S710 of FIG. 7, the transmission of the response to the external apparatus switch request from the host apparatus 100 to the target apparatus 200 is substantially similar to the transmission of the response to the external apparatus switch request from the host apparatus 100 to the target apparatus 200 in operation S310 of FIG. 3, thus, redundant descriptions thereof are omitted here.

In operation S711 of FIG. 7, the target apparatus 200 determines an access authority (operation S811).

The control unit 210 of the target apparatus 200 may receive, from the host apparatus 100, the response to the external apparatus switch request (e.g., the accessory switch request response message 632b) by using the mobile communication unit 220 and/or the sub-communication unit 230.

The control unit 210 of the target apparatus 200 may determine the second video player application 501 as compatible, in correspondence to reception of the accessory switch request response message 632b. The compatible second video player application 501 may execute, by control of the control unit 210, content that is executed in the first video player application 500. The control unit 210 of the target apparatus 200 may determine whether to execute, via the second video player application 501, the content that is executed in the first video player application 500, by using the compatible information field of the compatible application message 632c.

In operation S711 of FIG. 7, the determination of the access authority, which is performed by the target apparatus 200, is substantially similar to the determination of the access authority, which is performed by the target apparatus 200, in operation S311 of FIG. 3, thus, redundant descriptions thereof are omitted here.

In operation S712 of FIG. 7, the target apparatus 200 and the external apparatus 300 are connected with each other (operation S812).

Figure 9D:
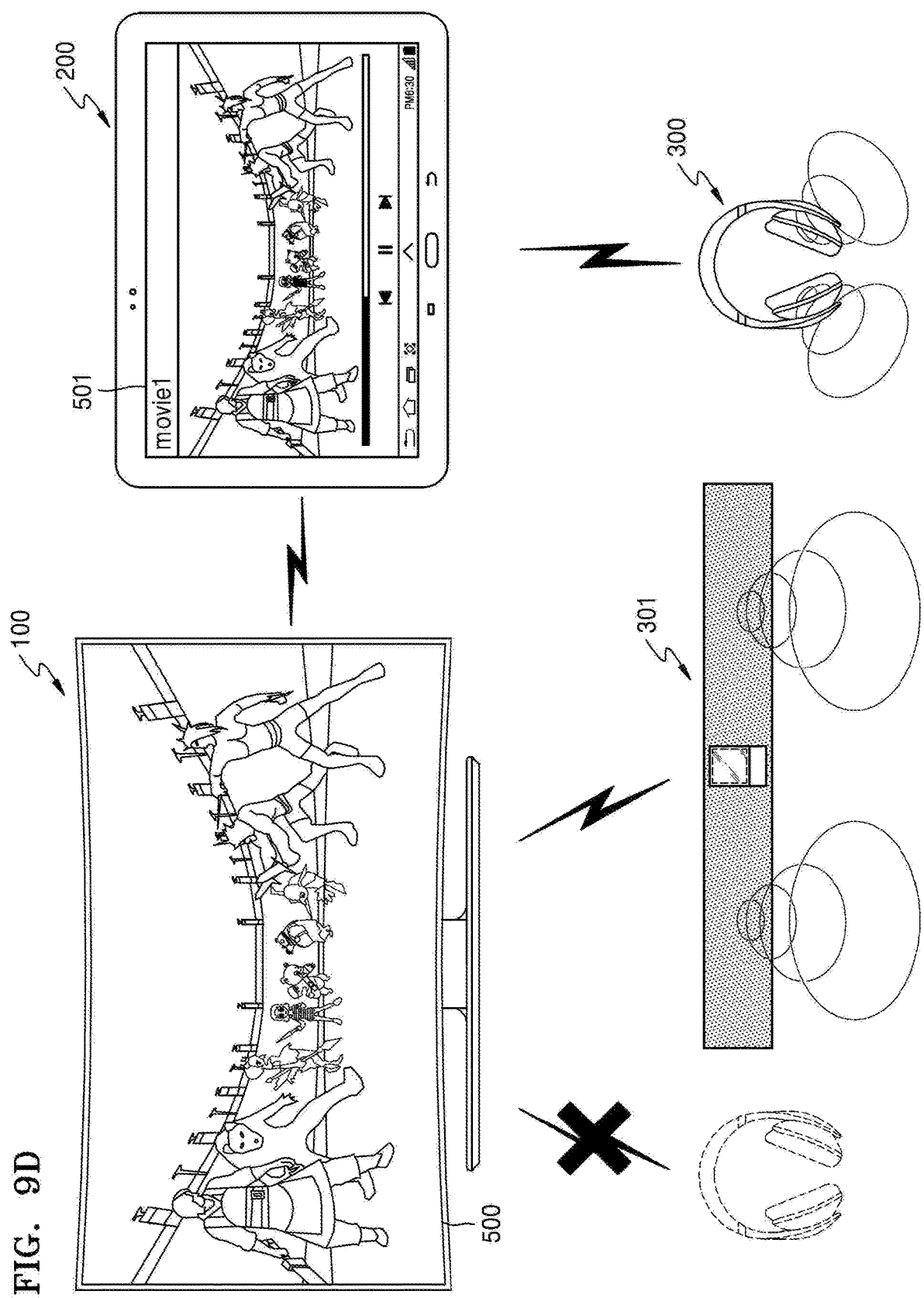

Referring to FIG. 9D, the control unit 210 of the target apparatus 200 may search for the adjacent selected external apparatus 300 by using the accessory switch request response message 632b received via the mobile communication unit 220 and/or the sub-communication unit 230. The control unit 210 of the target apparatus 200 may search for the selected external apparatus 300 by using an external apparatus mapping identifier. The control unit 210 of the target apparatus 200 may search for the external apparatus 300 by using pre-stored external apparatus information. The control unit 210 of the target apparatus 200 may be connected to the external apparatus 300 by using the external apparatus mapping identifier and the external apparatus information. The external apparatus 300 that is a connection target may be selected, by a user, from a search list (not shown) corresponding to a search result displayed on a screen of the target apparatus 200, and may be connected with the target apparatus 200.

In operation S712 of FIG. 7, the connection between the target apparatus 200 and the selected external apparatus 300 is substantially similar to the connection between the target apparatus 200 and the external apparatus 300 in operation S312 of FIG. 3, thus, redundant descriptions thereof are omitted here.

In operation S713 of FIG. 7, content is transmitted from the host apparatus 100 to the target apparatus 200 (operation S813).

The control unit 110 of the host apparatus 100 may transmit the content, which is executed in the first video player application 500, to the target apparatus 200 via the communication unit 130.

The control unit 110 of the host apparatus 100 may transmit not only the content but also first application information (e.g., a first video player application) stored in the storage unit 180 to the target apparatus 200.

In operation S713 of FIG. 7, the transmission of the content from the host apparatus 100 to the target apparatus 200 is substantially similar to the transmission of the content from the host apparatus 100 to the target apparatus 200 in operation S313 of FIG. 3, thus, redundant descriptions thereof are omitted here.

In operation S714 of FIG. 7, the content is output from the target apparatus 200 to the external apparatus 300 (operation S814).

Referring to FIG. 9D, when the content is received from the host apparatus 100, the control unit 210 of the target apparatus 200 may reproduce the content in the second video player application 501. The control unit 210 of the target apparatus 200 may seamlessly reproduce the content in the second video player application 501 by using the first application information. The control unit 210 of the target apparatus 200 may store the content and the first application information in the storage unit 275.

The control unit 210 of the target apparatus 200 may provide a user with a feedback corresponding to the content execution (e.g., an output of the content from the target apparatus 200 to the external apparatus 300) in the second video player application 501.

The control unit 210 of the target apparatus 200 may output, to the external apparatus 300, the content that is reproduced in the second video player application 501. The control unit 310 of the external apparatus 300 may output the content via at least one of the display unit 370 and the speaker 375. For example, when the content is a video, the control unit 310 of the external apparatus 300 may output the content via the display unit 370 and the speaker 375. When the content is an audio, the control unit 310 of the external apparatus 300 may output the content via the speaker 375.

In operation S714 of FIG. 7, the output of the content from the target apparatus 200 to the selected external apparatus 300 is substantially similar to the output of the content from the target apparatus 200 to the external apparatus 300 in operation S314 of FIG. 3, thus, redundant descriptions thereof are omitted here.

When the content of the target apparatus 200 is output to the external apparatus 300, the method of outputting content, the method performed by the host apparatus 100, the target apparatus 200, and the external apparatus 300, is ended.

As described above, according to the electronic apparatus and the method of outputting content, the method performed by the electronic apparatus, according to the one or more of the above exemplary embodiments, the electronic apparatus selectively outputs the content according to connection between the external apparatus and the second electronic apparatus or according to connection between the external apparatus and the first electronic apparatus, in correspondence to a switch of a wireless connection with the external apparatus and a result of the compatibility analysis.

According to the first electronic apparatus and the method of outputting content, the method performed by the first electronic apparatus, according to the one or more of the above exemplary embodiments, the first electronic apparatus is connected to the external apparatus and outputs the content according to a result of the compatibility analysis and a request for switching a wireless connection with the external apparatus that is connected to the second electronic apparatus and outputs the content.

According to the first electronic apparatus and the method of outputting content, the method performed by the first electronic apparatus, according to the one or more of the above exemplary embodiments, the first electronic apparatus is connected to the external apparatus and seamlessly outputs the content according to the received first application information and a request for switching a wireless connection with the external apparatus that is connected to the second electronic apparatus and outputs the content.

As described above, according to the external apparatus and the method of outputting content, the method performed by the external apparatus, according to the one or more of the above exemplary embodiments, the external apparatus selectively outputs the content according to connection between the external apparatus and the second electronic apparatus or according to connection between the external apparatus and the first electronic apparatus, in correspondence to a switch of a wireless connection with the external apparatus and a result of the compatibility analysis.

The one or more of the above exemplary embodiments of the inventive concept can also be embodied as programmed commands to be executed in various computer means, and then can be recorded to a non-transitory computer-readable recording medium. The computer-readable recording medium may include one or more of the programmed commands, data files, data structures, or the like. The non-transitory computer-readable recording medium that is erasable or is re-recordable may be embodied as a volatile or non-volatile storage device such as a ROM, a memory such as a RAM, a memory chip, or an integrated circuit, or a storage medium such as a CD, a DVD, a magnetic disc or a magnetic tape that is optically or magnetically recordable and simultaneously is readable by a machine (e.g., a computer). A memory that may be included in a mobile terminal is an example of a machine-readable storing medium for storing one or more programs that include instructions to implement one or more of the above exemplary embodiments. The programmed commands recorded to the non-transitory computer-readable recording medium may be particularly designed or configured for the inventive concept.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of outputting media content, the method performed by a first electronic apparatus and comprising:

establishing a direct wireless communication connection with a second electronic apparatus, wherein the second electronic apparatus establishes a direct wireless communication connection with an external apparatus to output, to the external apparatus, a first media content, and wherein the first media content is reproduced by a first application of the second electronic apparatus independently from the first electronic apparatus and prior to the direct wireless communication connection between the second electronic apparatus and the first electronic apparatus;

wirelessly receiving apparatus information of the external apparatus originated from the second electronic apparatus;

wirelessly transmitting, to the second electronic apparatus, a message for switching the direct wireless communication connection between the second electronic apparatus and the external apparatus to the first electronic apparatus;

wirelessly receiving, from the second electronic apparatus, a response to the message;

establishing a direct wireless communication connection between the first electronic apparatus and the external apparatus based on the response and the received apparatus information;

reproducing, by a second application of the first electronic apparatus, a second media content corresponding to the first media content reproduced by the first application of the second electronic apparatus; and outputting, to the external apparatus, the second media content via the direct wireless communication connection between the first electronic apparatus and the external apparatus, wherein the second application is compatible with the first application.

2. The method of claim 1, wherein the establishing the direct wireless communication connection between the first electronic apparatus and the external apparatus comprises connecting with the external apparatus by using one of a part of the apparatus information of the external apparatus and a part of the response.

3. The method of claim 1, further comprising receiving a user input for executing the second application.

4. The method of claim 1, wherein the receiving of the apparatus information comprises receiving, from the second electronic apparatus, all or a part of the apparatus information of the external apparatus prestored in the second electronic apparatus.

5. The method of claim 1, wherein the message comprises media information corresponding to information about the second application.

6. The method of claim 1, wherein the receiving of the response comprises receiving, from the second electronic apparatus, a response message comprising access authority information with respect to the external apparatus.

7. The method of claim 1, wherein the outputting of the second media content comprises seamlessly outputting the second media content to the external apparatus.

8. The method of claim 1, wherein the method further comprises providing at least one of visual feedback, acoustic feedback, and tactile feedback, in response to the second media content reproduced by the second application being output to the external apparatus.

9. The method of claim 1, wherein, if a plurality of external apparatuses are connected with the second electronic apparatus, the receiving of the apparatus information comprises receiving, from the second electronic apparatus, each of a plurality of pieces of apparatus information of the plurality of external apparatuses.

10. The method of claim 9, wherein the transmitting the message comprises:

in response to the plurality of pieces of apparatus information of the plurality of external apparatuses being received from the second electronic apparatus, selecting one of the plurality of external apparatuses that correspond to the plurality of pieces of received apparatus information, respectively; and requesting the second electronic apparatus to switch a wireless connection with the selected external apparatus from the second electronic apparatus to the first electronic apparatus.

11. The method of claim 10, further comprising, in response to a response to the requesting to switch the wireless connection with the selected external apparatus being received, establishing a wireless communication connection with the selected external apparatus.

12. A first electronic apparatus configured to output media content, the first electronic apparatus comprising:

at least one memory comprising computer executable instructions;

at least one processor configured to execute the computer executable instructions, the computer executable instructions causing the at least one processor to perform:

establishing a direct wireless communication connection with a second electronic apparatus;

wirelessly receiving apparatus information of an external apparatus originated from the second electronic apparatus;

wirelessly transmitting, to the second electronic apparatus, a message for switching a direct wireless communication connection between the second electronic apparatus and the external apparatus to the first electronic apparatus;

wirelessly receiving a response to the message from the second electronic apparatus;

establishing a direct wireless communication connection between the first electronic apparatus and the external apparatus based on the response;

outputting a second media content corresponding to a first media content reproduced in the second electronic apparatus to the external apparatus, the second media content corresponding to the first media content previously output by the second electronic apparatus to the external apparatus independently of and prior to the direct wireless communication connection between the second electronic apparatus and the first electronic apparatus, via the direct wireless communication connection between the first electronic apparatus and the external apparatus.

13. The first electronic apparatus of claim 12, wherein, if a plurality of external apparatuses are connected with the second electronic apparatus, the receiving of the apparatus information comprises receiving, from the second electronic apparatus, each of a plurality of pieces of apparatus information of the plurality of external apparatuses.

14. The first electronic apparatus of claim 13, wherein the requesting comprises:

in response to the plurality of pieces of apparatus information of the plurality of external apparatuses being received from the second electronic apparatus, selecting one of the plurality of external apparatuses that correspond to the plurality of pieces of received apparatus information, respectively; and requesting the second electronic apparatus to switch a wireless connection with the selected external apparatus from the second electronic apparatus to the first electronic apparatus.

15. The first electronic apparatus of claim 14, wherein the computer executable instructions further cause the at least one processor to perform:

in response to a response to the requesting to switch the wireless connection with the selected external apparatus being received, establishing a wireless communication connection with the selected external apparatus.

* * * * *